(12) United States Patent
Daniel et al.

(10) Patent No.: US 7,724,238 B2
(45) Date of Patent: May 25, 2010

(54) FLAT AND COLLAPSIBLE MOUSE

(76) Inventors: Simon Richard Daniel, Abbotswood, Rowhills, Surrey (GB) GU9 9AU; Christopher Verity Wright, 116 Bath Road, Stroud (GB) GL53NX ( * ) Notice: Subject to any disclaimer, the term of this patent is extended or adjusted under 35 U.S.C. 154(b) by 900 days.

(21) Appl. No.: 11/194,255

(22) Filed: Aug. 1, 2005

(65) Prior Publication Data

US 2006/0176277 A1    Aug. 10, 2006

(30) Foreign Application Priority Data

Aug. 6, 2004    (GB)    ................................. 0417562.6

(51) Int. Cl.
G09G 5/08    (2006.01)
(52) U.S. Cl. ........................ 345/163; 345/156
(58) Field of Classification Search ................. 345/163, 345/156
See application file for complete search history.

(56) References Cited

U.S. PATENT DOCUMENTS

| | | | |
|---|---|---|---|
| 5,847,696 A * | 12/1998 | Itoh et al. .................... | 345/163 |
| 6,157,370 A | 12/2000 | Kravtin et al. | |
| 6,304,249 B1 * | 10/2001 | Derocher et al. ............ | 345/163 |
| 6,369,798 B1 * | 4/2002 | Yatsu et al. ................. | 345/167 |
| 6,476,795 B1 * | 11/2002 | Derocher et al. ............ | 345/163 |
| 6,489,947 B2 | 12/2002 | Hesley et al. | |
| 6,747,633 B2 * | 6/2004 | Jzuhsiag ...................... | 345/163 |
| 6,970,156 B1 * | 11/2005 | Silverstein .................. | 345/163 |
| 6,970,159 B2 * | 11/2005 | Gray ........................... | 345/173 |
| 7,109,972 B2 * | 9/2006 | Fu ............................... | 345/163 |
| 7,209,116 B2 * | 4/2007 | Gates et al. .................. | 345/156 |
| 7,330,923 B2 * | 2/2008 | Wenstrand et al. ........... | 710/303 |
| 2001/0033268 A1 * | 10/2001 | Jiang .......................... | 345/163 |
| 2002/0044133 A1 * | 4/2002 | Nakamura et al. .......... | 345/163 |
| 2002/0196234 A1 * | 12/2002 | Gray ........................... | 345/163 |
| 2004/0012568 A1 * | 1/2004 | Velikov et al. .............. | 345/163 |
| 2005/0078087 A1 * | 4/2005 | Gates et al. .................. | 345/163 |
| 2005/0122312 A1 * | 6/2005 | Huang et al. ................. | 345/163 |

(Continued)

FOREIGN PATENT DOCUMENTS

GB    2411452    *    8/2004

(Continued)

OTHER PUBLICATIONS

International Search Report for Application No. PCT/GB2005/003011, dated Mar. 17, 2006 (2 p.).

(Continued)

*Primary Examiner*—Bipin Shalwala
*Assistant Examiner*—Afroza Y Chowdhury
(74) *Attorney, Agent, or Firm*—Conley Rose, P.C.

(57) ABSTRACT

A mouse (1) suitable for use as a computer input device that is collapsible between a flat configuration in which the mouse (1) is generally planar, and an optional popped configuration in which the mouse (1) has increased volume and forms a generally curved ergonomic profile, where said mouse (1) can be used for wireless data input and control and is operable in either configuration, and can be conveniently attached when flat with a docking cradle or tray (3) that slides into a card-shaped recess (13), such as a PCMCIA or CardBus interface slot within a host device (12) for the purposes of storage, battery recharging, and where said docking cradle (3) can directly provide wireless connectivity and control information between the mouse (1) and host device (12). The mouse (1) may support a combination of buttons (4) and capacitance panels (41) for increased control.

19 Claims, 24 Drawing Sheets

U.S. PATENT DOCUMENTS

2006/0022943 A1     2/2006    Johnson et al.

FOREIGN PATENT DOCUMENTS

WO        2006/015143       2/2006

OTHER PUBLICATIONS

Patent Abstracts of Japan vol. 2000, No. 19 (Jun. 5, 2001) and JP 2001 034405 A (NEC Corp) Feb. 9, 2001.

* cited by examiner

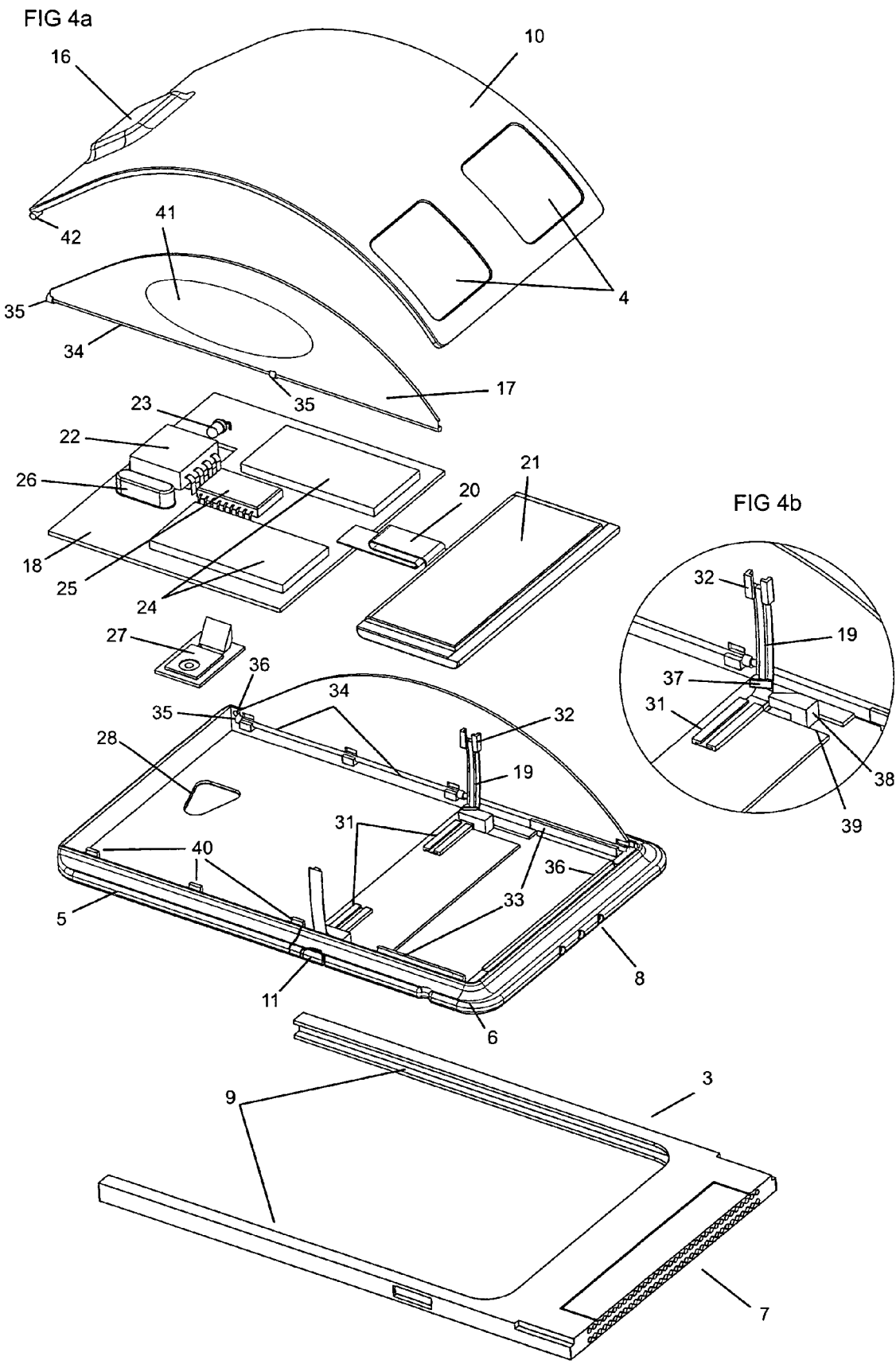

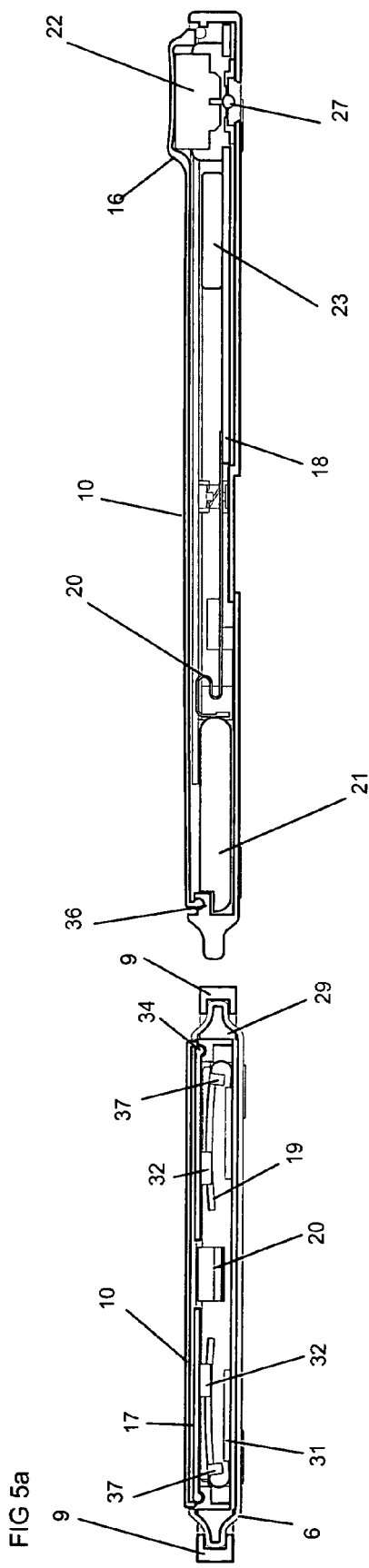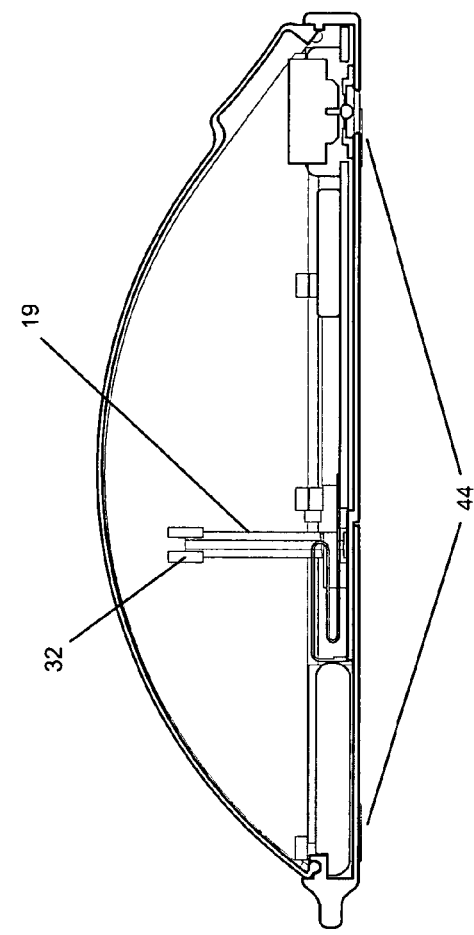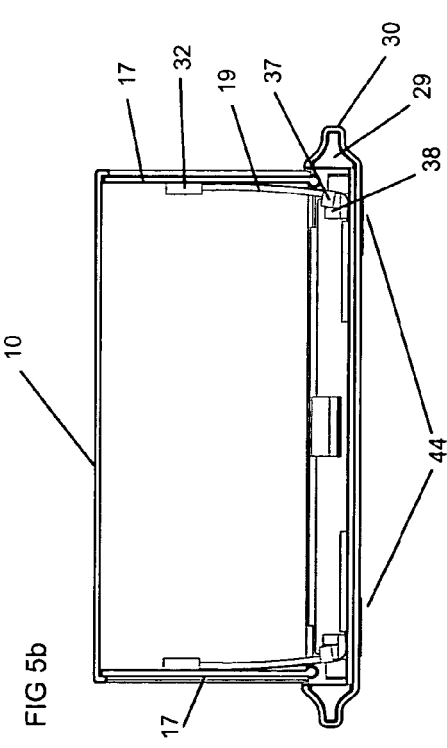
FIG 5a
FIG 5b

FIG 6a
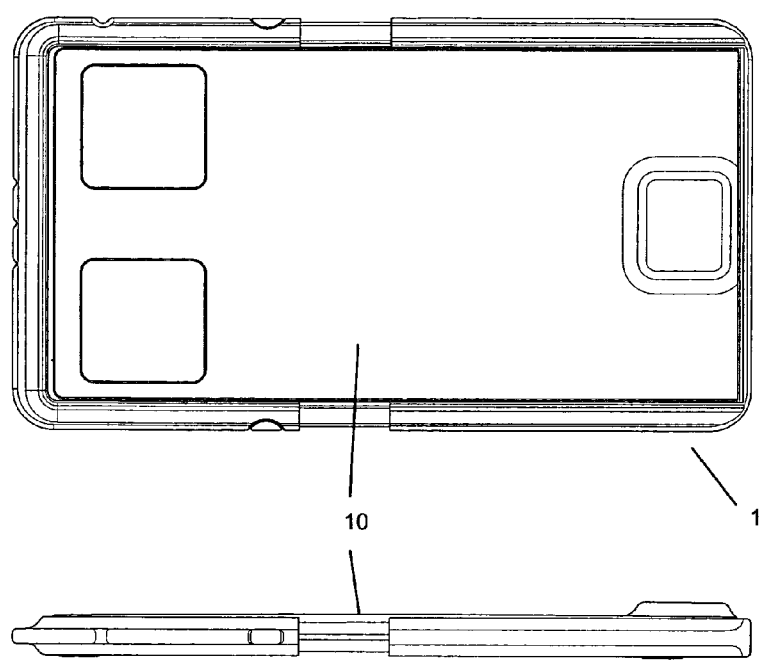
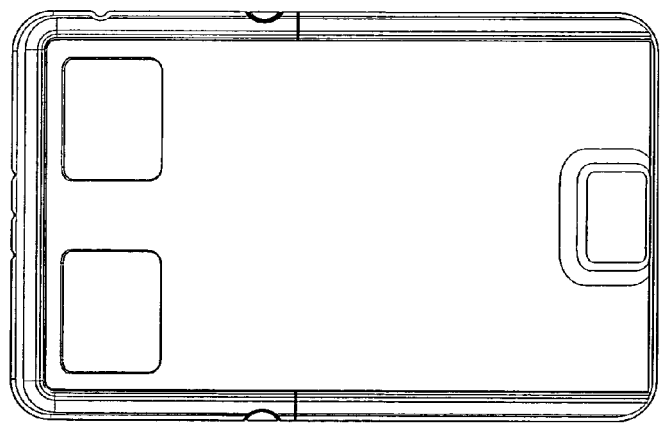
FIG 6b
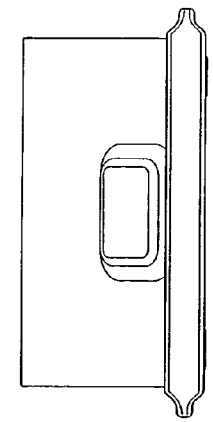
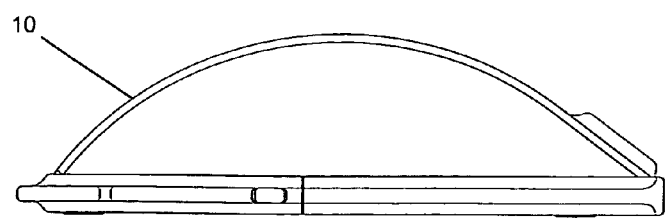

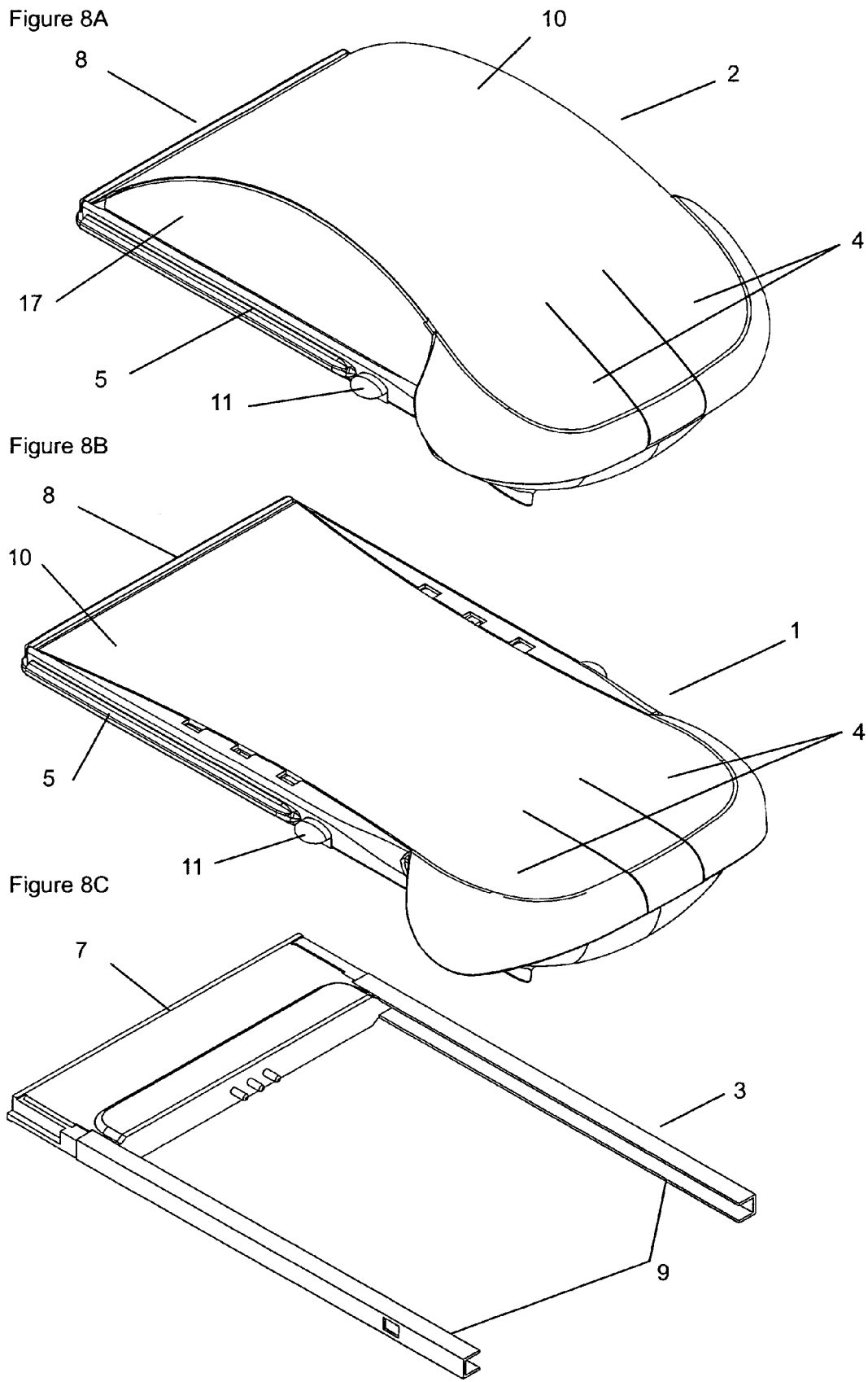

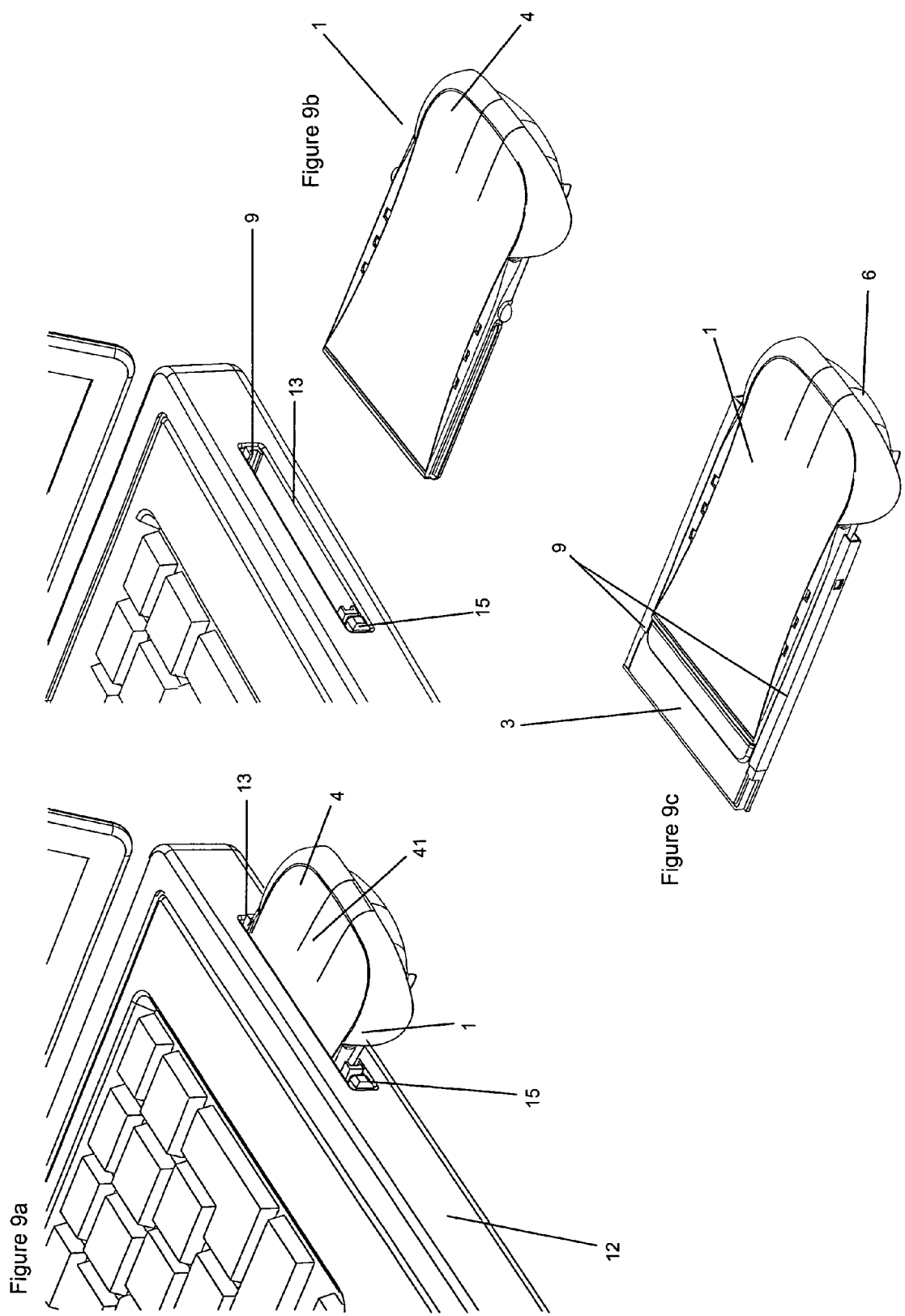

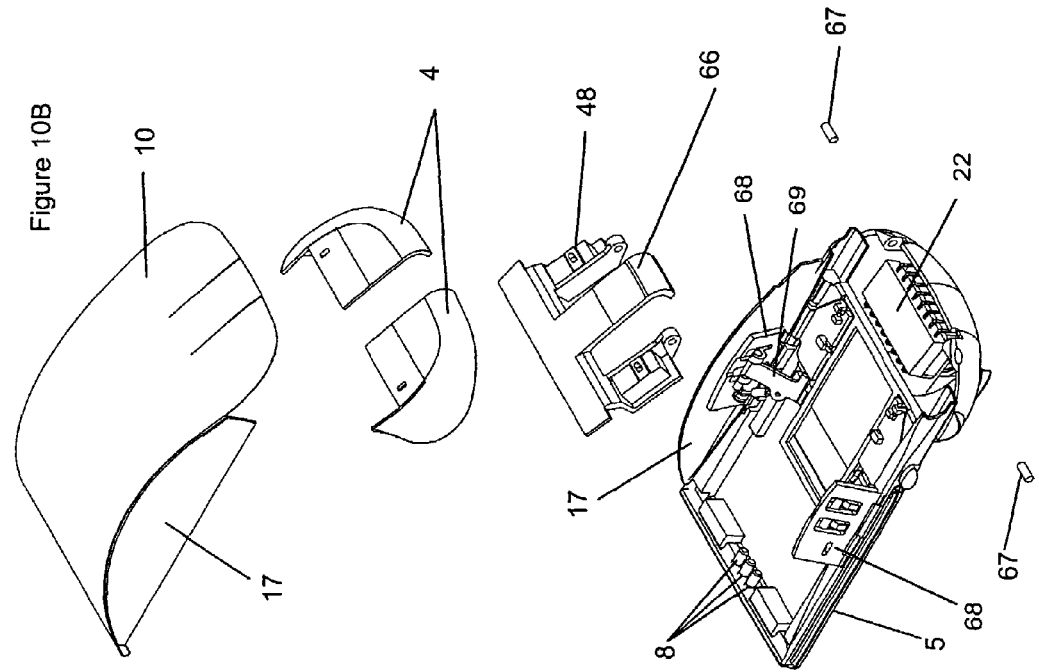
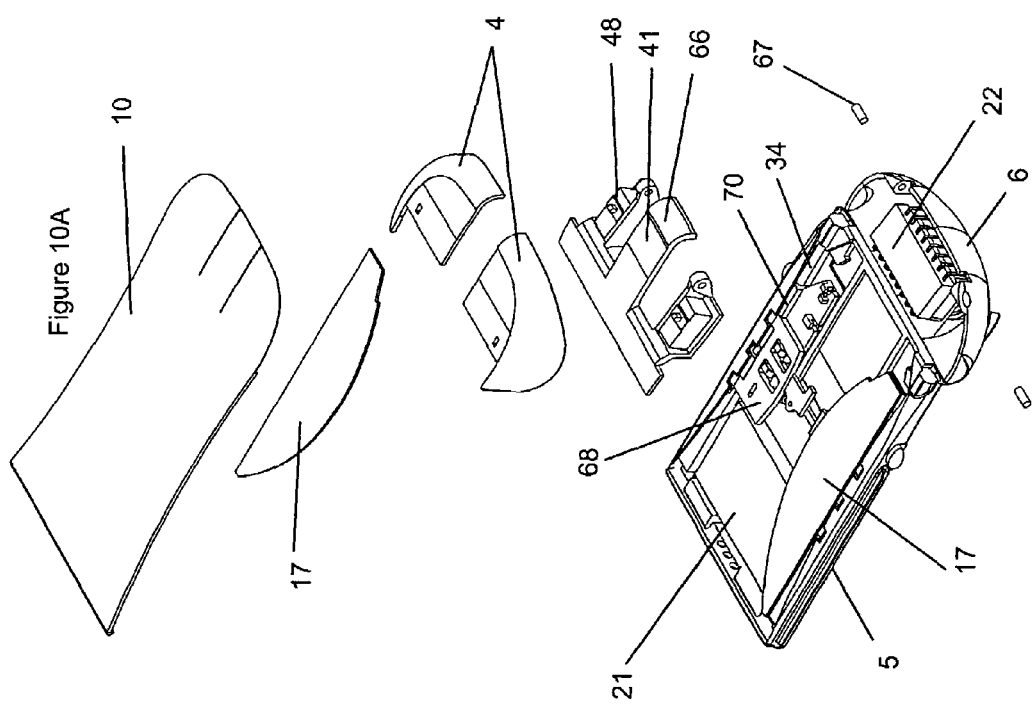

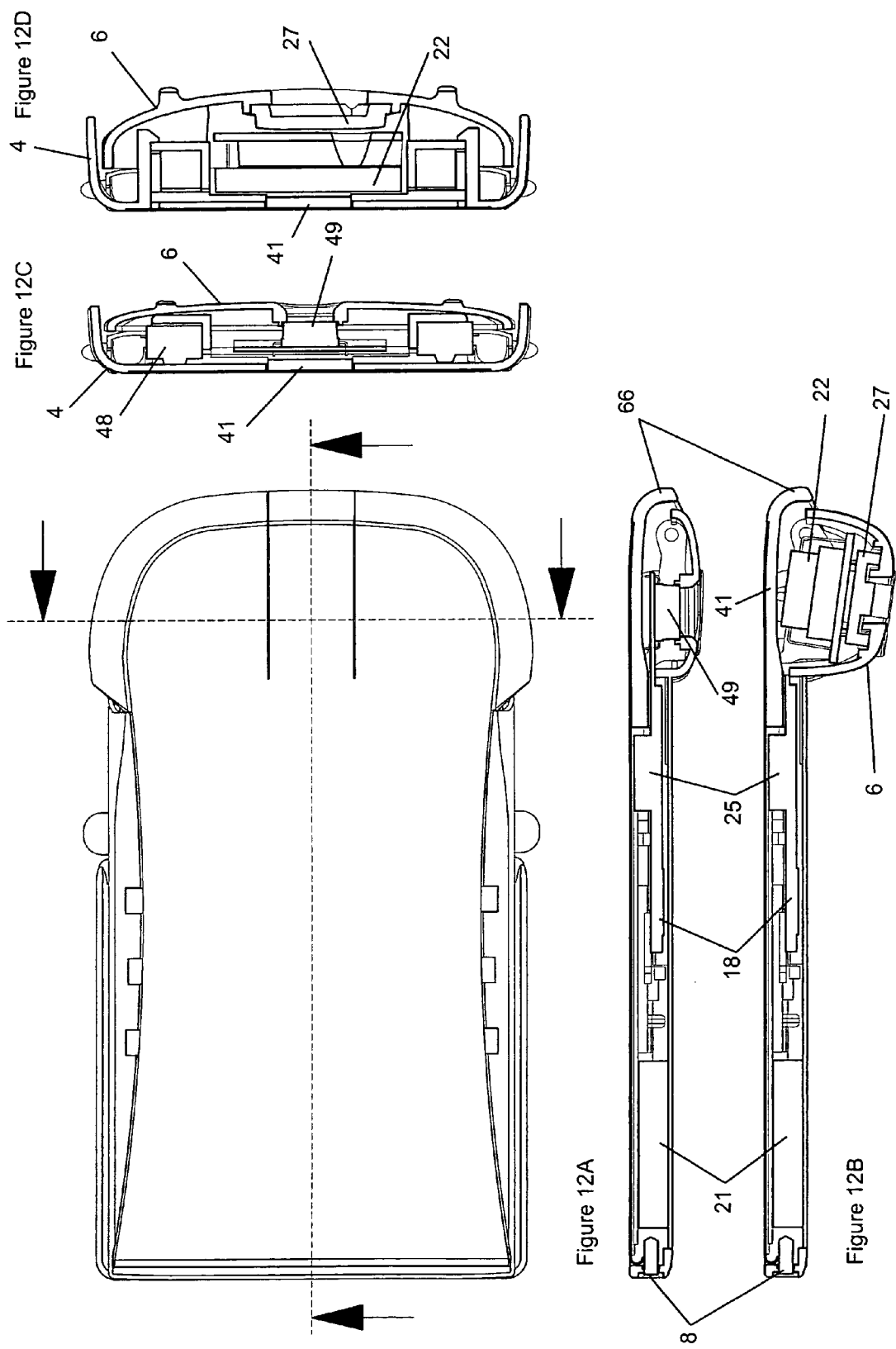

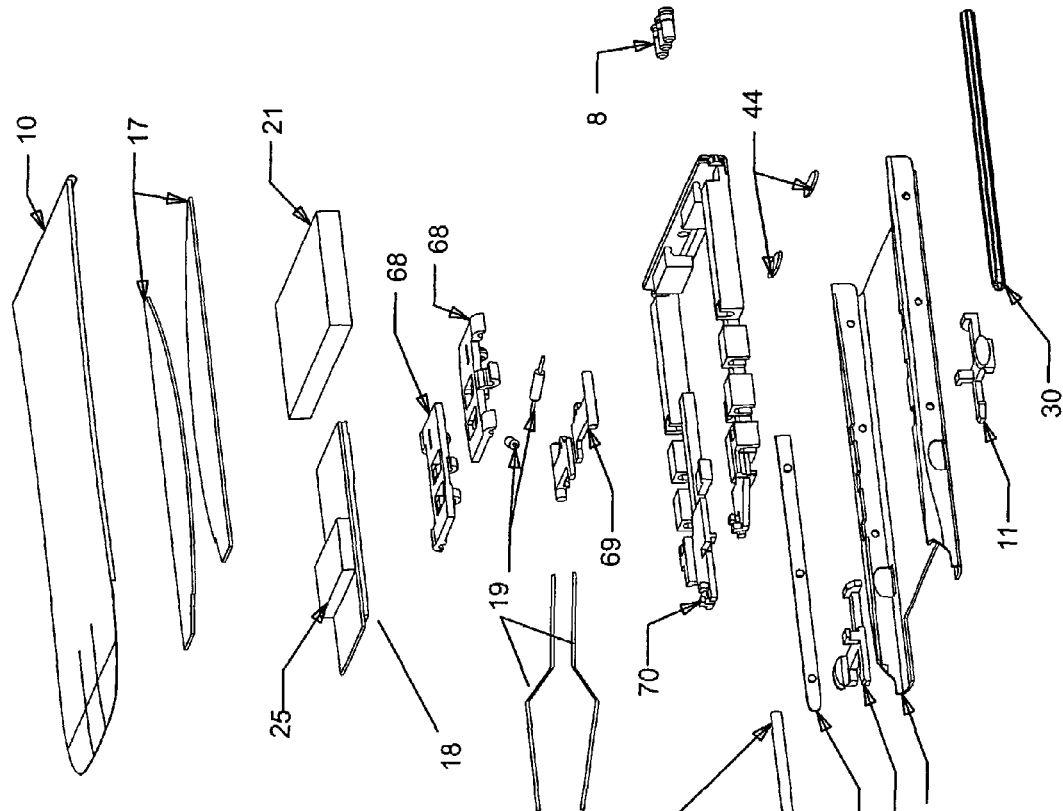
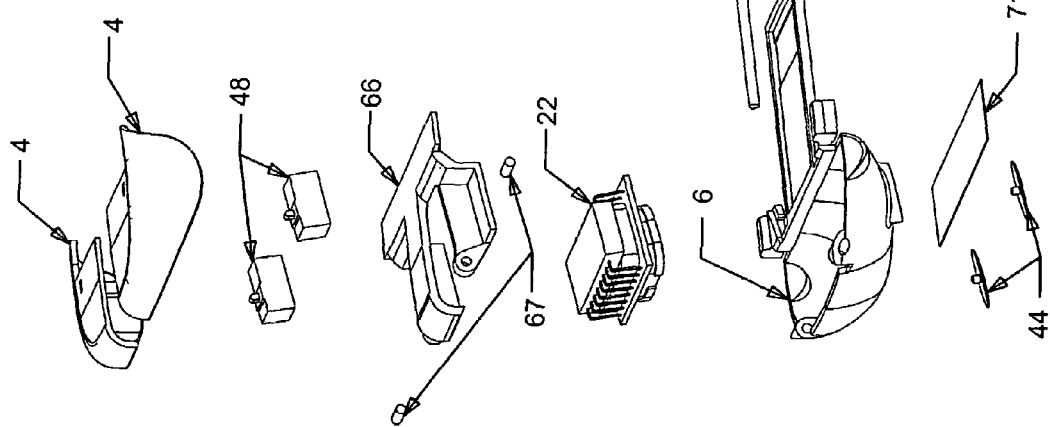
Figure 15

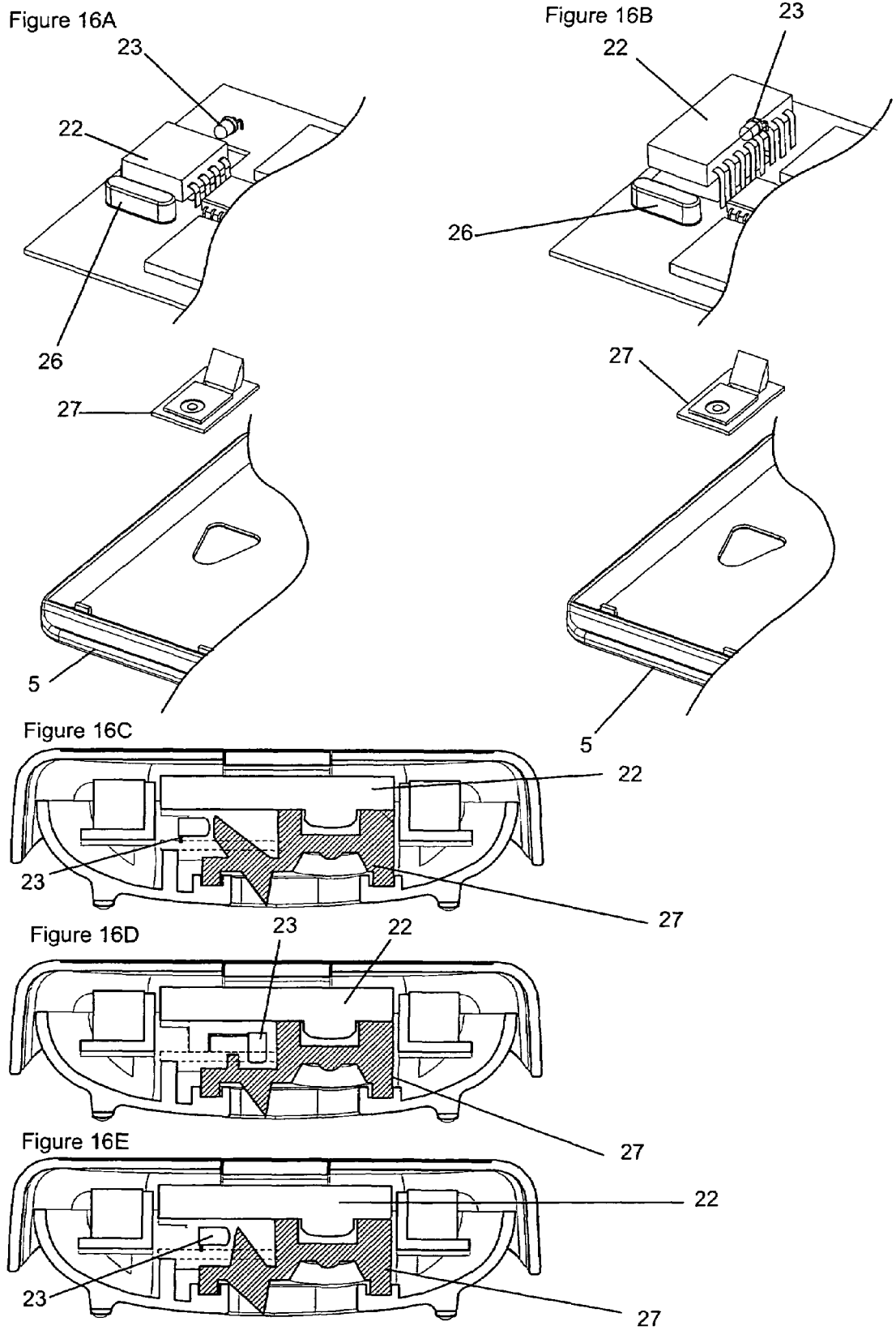

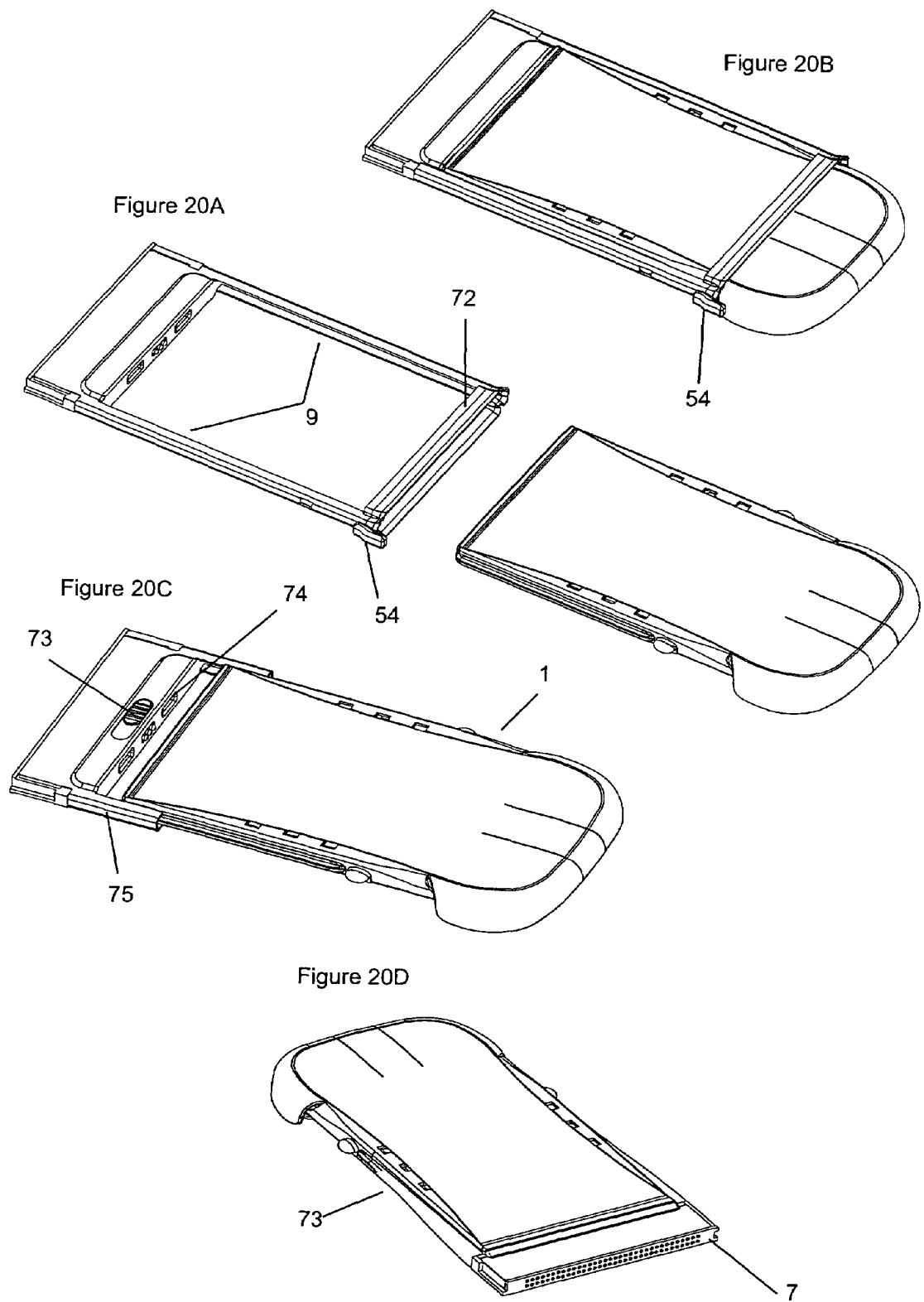

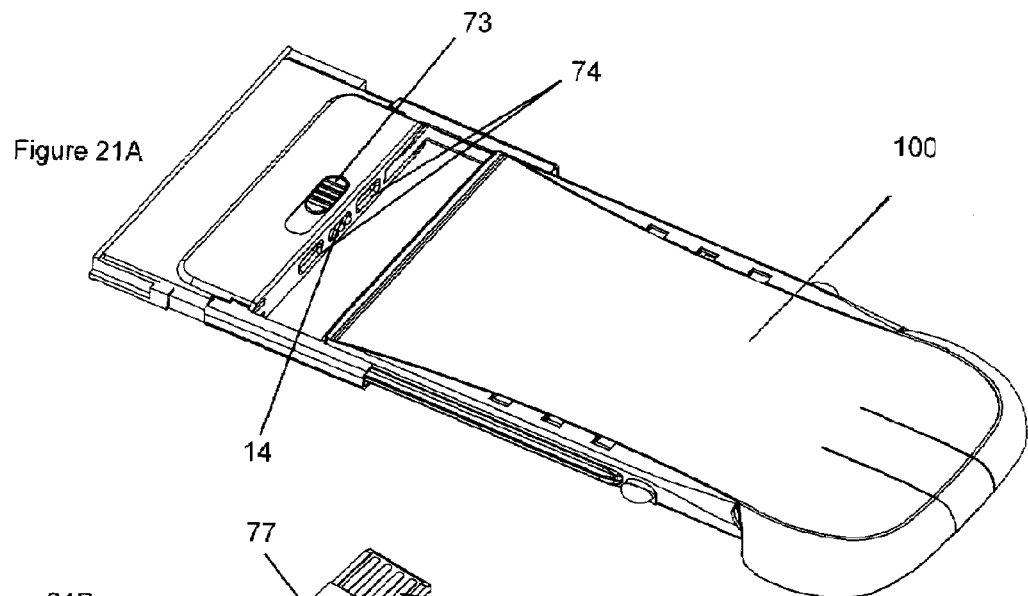
Figure 21A
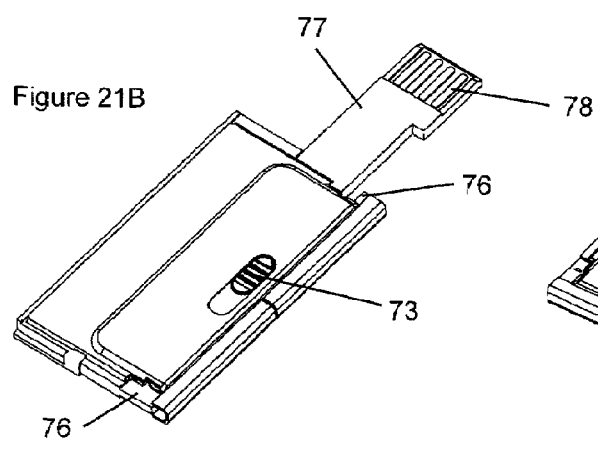
Figure 21B
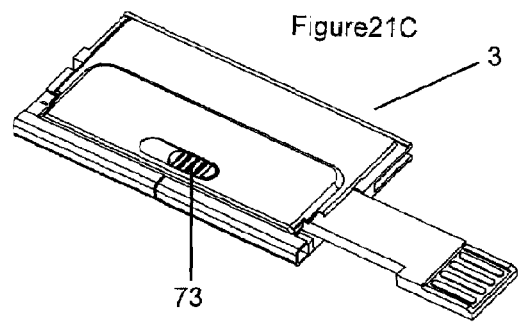
Figure 21C
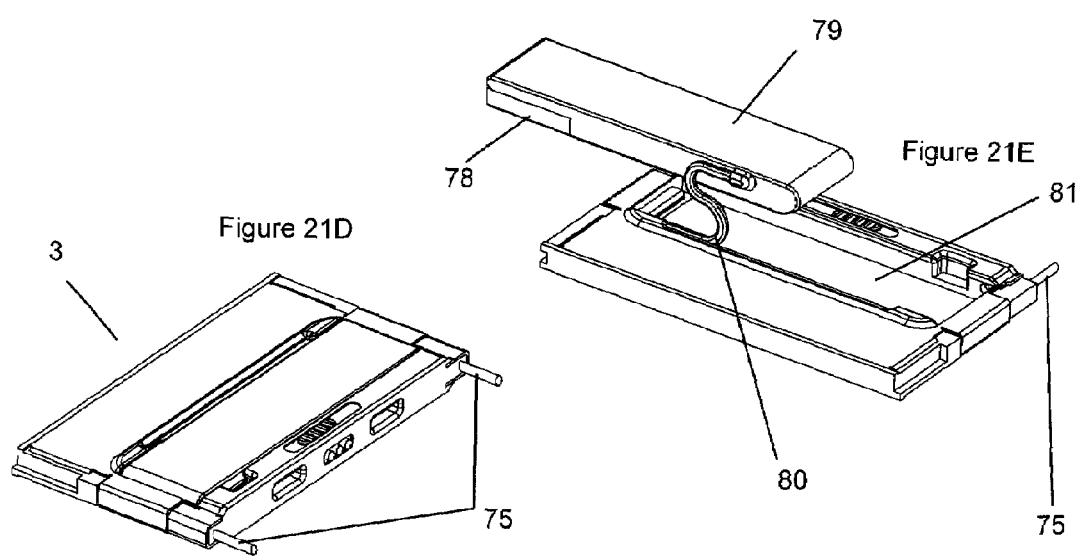
Figure 21D
Figure 21E

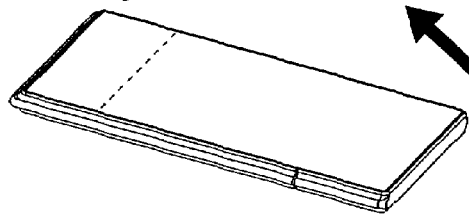
Figure 24A
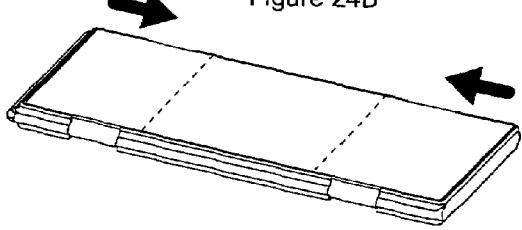
Figure 24B
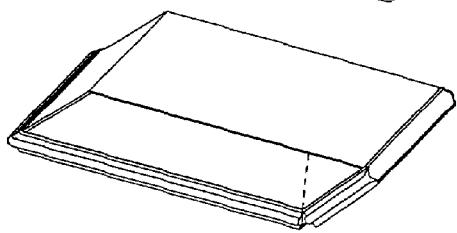
Figure 24C
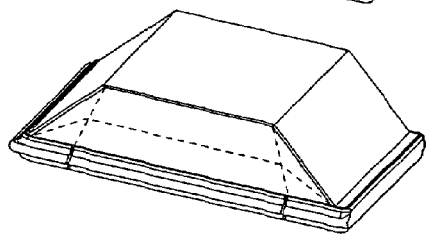
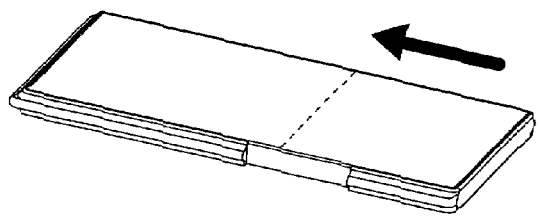
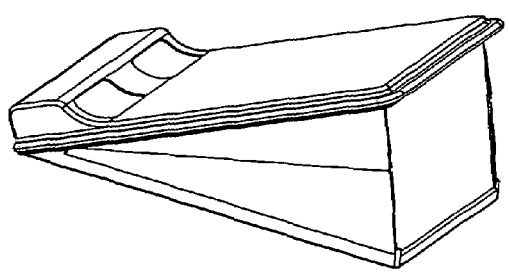
Figure 24E
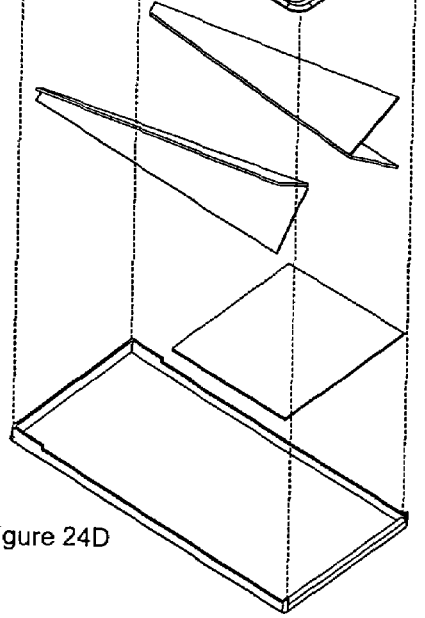
Figure 24D

FLAT AND COLLAPSIBLE MOUSE

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD OF THE INVENTION

The present invention relates to a mouse for controlling a cursor on a screen of a computing device. A preferred embodiment of the invention relates to a portable mouse used to provide x-y position and selection data for controlling a cursor on a nearby computer device, which is operable when flat and capable of being stored in a docking cradle that fits a card-shaped recess in a computer, such as a PCMCIA or CardBus slot, and is collapsible between a flat configuration in which the mouse is generally planar, and an optional popped configuration in which the mouse has increased volume and forms a generally curved ergonomic profile. The device uses a wireless connectivity means to provide data exchange between the docking cradle attached to the computer and the mouse when in use, and utilizes compact optical or gyroscopic components to sense lateral movement. The device also uses capacitance sensor technology applied to the upper surface or innovatively to side-panels to provide additional control and selection application. The mouse thus provides a flexible input device, usable in a flat and extended form, and conveniently stored when not in use or for recharging.

BACKGROUND OF THE INVENTION

A major problem with the provision of input devices for portable computing devices is the large and unusual form-factor of the traditional computer mouse, which is unusual in shape, bulky and difficult to carry in a pocket or bag sleeve, and contains a long connector cable. This has obviously resulted in mouse designs using a retractable wire or using wireless technology for communication, which generally has required the additional need for a wireless dongle or card attached to the main computer. Various alternative mouse technologies have also been widely introduced, such as embedding touch-pads or miniature or fold-out joy-sticks onto a portable computer or using an interactive touch-screen for fingers or a stylus, however, such approaches suffer from requiring consumers to change behaviour and are generally not preferred as a mouse replacement. This is particularly important given the frequency of mouse usage required to control modern desktop environments, and users generally welcome the speed and form-factor afforded by a traditional mouse when at their desk-top computer or when using their portable device for a major activity.

Accordingly there is a need for a portable mouse that provides a compact and complete wireless solution as a flat device suitable for storing easily in a pocket or within a recess of a portable device, and can be easily used in a flat form or extended into a more traditional ergonomic form.

There is substantial and diverse prior art relating to computer mouse designs and x-y input devices in general, with the majority covering different ergonomic forms of mouse, button combination and mechanical mould assembly, and different movement sensor technology approaches from wheels to balls, to optical and gyroscopic means, as well as different software control approaches and different wiring arrangements, wire storage solutions or wireless connectivity approaches.

However, despite the large volume of granted patents and other prior art, many covering similar approaches, a small subset address the problems required of the portable mouse, with the majority of those covering alternative technological methods such as touch-pads, or joysticks, or requiring a custom designed recess in a computer device that accommodates a custom mouse design. Where collapsible or extendable devices have been considered they have generally been from the motivation of making an operable open configuration more ergonomic and generally provide some reduction in size for storage in a non operable mode, usually suggested by high-level mechanical concepts that lack a precise mechanical implementation. The prior art has not addressed the opportunity, nor the mechanical and electrical component challenges of making a flat mouse operable and extendable in the innovative and elegant way disclosed in detail in on our invention, nor the synergies in compatibility and portability by integrating this with a docking tray shaped to be accommodated in standard card slots recesses, thus enabling a widespread universal application of the mouse with legacy and future portable devices.

By way of example, U.S. Pat. No. 3,541,541 by Engelbart (1967) and U.S. Pat. No. 3,835,464 by Rider (1973, assigned to Xerox Corp) provides an example of early mouse implementations, U.S. Pat. No. 4,404,865 by Kim discloses a traditional mouse trackball implementation, U.S. Pat. No. 4,538,476 by Luque (1983), a trackball assembly, U.S. Pat. No. 4,799,055 by Nestler discloses an early optical sensor arrangement, U.S. Pat. No. 4,862,165 by Gart discloses a mouse shaped into an ergonomic shape, U.S. Pat. No. 5,280,276 by Kwok shows a mouse with integrated track ball, U.S. Pat. No. 5,680,157 by Bidiville et al (assigned to Logitech) discloses a traditional mouse implementation (albeit ornamentally styled as a mouse), using an optical-mechanical sensor, U.S. Pat. No. 5,717,610 by Baba discusses another form of mouse of semi-spherical design using an additional pressure sensor, U.S. Pat. No. 5,880,715 by Garrett discloses a pyramid shaped mouse, U.S. Pat. No. 6,034,670 by Chen discloses a ergonomic mouse profile and internal mechanism, U.S. Pat. No. 6,172,354 by Adan et al discloses an example optical arrangement, U.S. Pat. No. 6,359,611 by Chan proposes a smaller form factor mouse to be finger controlled, U.S. Pat. No. 6,590,563 by Oross et al, discloses a mouse with removable ergonomic mouse extension, US application 2003/0076303 by Huppi (assigned to Apple), discloses a mouse with a third rotary wheel. These like many other examples disclose the plurality of granted forms of mechanical and technical implementations of traditional mouse forms.

In terms of alternative approaches, U.S. Pat. No. 4,459,578 by Sava discloses a finger joystick approach, U.S. Pat. No. 5,160,918 by Saposnik discloses a further example joystick sensor, U.S. Pat. No. 5,159,321 by Masaki et al discloses an example stylus pen input device, U.S. Pat. No. 5,808,602 by Sellers discloses a rotary control suitable for embedding in a device, U.S. Pat. No. 6,587,093 by Shaw discloses capacitive mouse sensors used around a track ball, U.S. Pat. No. 6,731,267 by Touriniemi et al discloses a single-touch dual input device, suitable for thumb control, U.S. Pat. No. 5,479,191 by Komatsu discloses a capacitive sensing area applied to a standalone accessory mouse like device, U.S. Pat. No. 6,677,930 by Nakamura et al discloses a central mouse button using capacitive sensing technology. U.S. Pat. No. 6,507,388 by Liao discloses an example of a touchpad x-y capacitance sensor applied to a portable computing device with U.S. Pat. No. 5,327,162 showing the components forming a 2D capacitance x-y input device for mounting on a computer.

In terms of reducing wire impact, U.S. Pat. No. 6,600,479 by Smith et al, uses a retractable wire mechanism as does U.S. Pat. No. 6,738,046 by Chung, with U.S. Pat. No. 4,754,268 by Mori disclosing an early wireless mouse apparatus. An alternative has been to connect the mouse directly to the computer and store it within a custom recess, as disclosed in U.S. Pat. No. 5,428,355 by Jondrow (assigned to Hewlett Packard) where a mouse slides out from the computer, similarly in U.S. Pat. No. 5,490,039 by Helms (assigned to Dell) where the computer accommodates a slide out tray and a hole for a solid mouse form, and similarly U.S. Pat. No. 6,476,795 by Derocher (assigned to Hewlett Packard) for accommodating a mouse within a tray for the purpose of recharging.

In terms of moving or extendable mouse shells U.S. Pat. No. 5,847,696 by Itoh discloses the overall mouse shell shaped ergonomically and moving to act as input sensor, U.S. Pat. No. 6,304,249 by Derocher et al, (2001, assigned to Hewlett Packard) discloses the general principle of having a mouse shell cover collapse or extend when operable to give larger ergonomic forms and reduce in a non operable storage state, generally by high level mechanical means, and U.S. Pat. No. 6,157,370 by Kravtin, and U.S. Pat. No. 6,489,947 by Hesley of improving ergonomic form by affixing a mouse extension module.

Of note is U.S. Pat. No. 6,661,410 by Casebolt et al (which references recent optical patents), and discloses a general proximity method for power management purposes.

Despite the wealth of prior art on mouse and other input devices, none discloses the highly advantageous implementation of a separate wireless flat mouse that detects lateral movement and can be operable in a flat state, nor do they disclose the benefits of simplicity of our innovative collapse mechanism that enables the mouse to be popped to an enlarged ergonomic profile simply via a sliding mechanism, and combination with linked side-panels that enclose the extended mouse forming a rigid device, nor do they disclose the advantage of a planar mouse being storable within a suitably shaped docking card that can support wireless and control connectivity for the host computer, and can enable the overall mouse device to be storable within a universal card-shaped recess on the host computer for recharging or when not in use.

To the best of the applicant's knowledge, the prior art, whilst suggesting some features and numerous variations of mouse implementations and technologies in general, the prior art has not disclosed some of the highly advantageous features of the present invention discussed herein.

According to the present invention there is provided a mouse for controlling a cursor on a screen of a computing device, the mouse being reversibly expandable and collapsible between a flat generally planar configuration and a popped configuration, the mouse being operable in both configurations.

In an embodiment, the mouse is reversibly expandable and collapsible between a flat generally planar configuration and a popped configuration in which the device has a relatively greater volume, the mouse being operable in both configurations. The mouse may comprise one or more of a sensing device for detecting lateral physical movement of the interface device and generating x-y position data suitable for controlling a cursor on a computing device; a plurality of sensors providing co-ordinate and selection data; wireless connectivity means for transmitting input data from the interface device for use in controlling a said cursor on a said computing device; and, a rechargeable battery.

The preferred embodiment provides a portable mouse that is suitable for use as a computer input device and is collapsible between an operable flat configuration in which the mouse is generally planar, and a popped configuration in which the mouse has increased volume and forms a generally curved ergonomic profile, where the device when flat can be conveniently attached to or stored within a docking cradle or tray that slides into a card-shaped recess, such as a universal PCMCIA or CardBus interface slot within a host device for the purposes of storage and battery recharging, and where said docking cradle provides wireless connectivity and control means between a wireless module on the mouse and the host device. Said mouse supports a combination of touch sensitive buttons or mechanical push buttons and side or upper surface mounted capacitance panels that allow for additional slide or control functions.

The mouse device, of the present invention, in a preferred embodiment comprises a card-shaped docking cradle that can be stored within a card shaped recess of a host device, such as a CardBus interface slot and supports a sliding generally flat mouse device, where said docking cradle is formed as a base connector unit with universal electrically connecting interface pins and extends opposing parallel grooves for supporting the mouse device. Said docking cradle preferably encloses wireless control chips, circuitry and antenna for short-range communication to the mouse device.

Said preferred mouse device is similarly shaped in a flat configuration with opposing side edges shaped to slide into the docking cradle grooves and be storable within the card shaped recess of the host device, said mouse device generally having a flat portion stored within the recess limited by a standard thickness and a protruding section that could optionally be thicker for accommodating a sensor device, where said mouse device electrically connects to the docking cradle when stored for purposes of recharging and data connectivity, or when removed can connect via a wireless link to the docking cradle and host computer to provide input data. Said mouse device contains lateral movement sensor means and control circuitry to record and transmit x-y position information for controlling a cursor on the host device and supporting a plurality of buttons and capacitance sensors for selection and control purposes. Said movement sensor technology is preferably an optical or laser sensing or gyroscopic means, and comprises low profile chips suitable for enclosure within the card shaped device along with a suitable compact rechargeable battery such as a lithium ion polymer battery.

Said preferred mouse device is physically comprised from a rigid base unit and a generally parallel semi-flexible upper surface supporting sensor buttons, the base unit being constructed from two interlocking and sliding sections that can be pushed together and reversibly lock by means of a side button, the act of sliding serving to reduce the chord length of the upper surface and therefore mechanically bias the upper surface to form an arc or curved profile. Said base unit supports sprung hinged side panels that are fixed on opposing sides of one portion of the base unit, and arranged to be stored parallel to the base unit in the flat configuration, and are biased to become nearly perpendicular to the upper surface when the device is pushed together such that they enclose the overall mouse device and provide rigidity to the upper surface, and are lockable in a near perpendicular arrangement by mechanical means. Said rigid base also supports small low friction feet that serve to raise the device slightly from a surface and enable the mouse device to be moved smoothly.

In a preferred embodiment said buttons are positioned above said sensor technology and arranged to lie at the end of the mouse device and to protrude from the docking cradle and computer device when stored within a card slot. Such an arrangement allows for increased shaping of the buttons for ergonomic purposes and increased mechanical travel as buttons are depressed. Said mechanism providing similar button action when the mouse is in the collapsed flat or popped configuration.

In a preferred embodiment said sensor technology utilizes a highly compact or laser sensor technology that forms an integral chip incorporating a light source, processing camera chip and lens that minimizes the thickness of the mouse section protruding from the card slot.

Said locking mechanism is preferably achieved by having a rigid rib with central hinge spring affixed to the base unit and sliding within a groove on the side-panels, and is biased to form an angle such as seventy degrees or an intermediate angle between a flat zero degree position when the overall mouse device is flat, and a ninety degree angle when the mouse device is popped open, and locked by means of a shaped protrusion on the rib that mechanically abuts and rises over a similar shaped protrusion in the alternative base unit as the base units are pushed together. The rib therefore forms a stored flat 'U' shape when the mouse device is flat, a natural sprung 'V' shape, and a deployed 'L' shape when the mouse device is curved.

Said side-panels preferably support a capacitance sensor or surface detection means, or mechanical button sensor affixed to the inner rib, whereby they can provide selection and control data when a thumb or finger is say slid laterally along the side of the mouse device, or when compressed, thus providing an additional control equivalent to a third rotary wheel on a traditional mouse. A major benefit of having said sensors on alternative vertical sides of the mouse is that they could provide two additional sliding controls suitable for controlling Z direction movement in a three-dimensional application such as a game, advanced 3D desktop environment (as is being developed by Apple, Sun and Microsoft), 3D graphics programs, and other applications where they could be customized such as for scrolling a window or webpage, selecting from a drop down menu or rotating a file index system.

In a further embodiment said capacitance sensor or surface detection means could be mounted between the buttons on the flat area of the upper surface, or mounted on the flexible area of the upper surface.

A major advantage of the preferred mouse device is the compact planar form-factor that can be readily stored within universal card-recesses on devices and easily recharged, and is highly compact for portable use when carried in a pocket, bag sleeve, or when affixed to the side of a portable device. The overall form-factor with a smooth side edge shape that is preferably a rubbery textured material provides a device that is highly operable in the flat configuration.

The elegant mechanism to pop the mouse upwards and form a three dimensionally shaped mouse with curved ergonomic profile, simply by pushing the base unit together, provides a rapid method of changing the mouse shape as well as the benefit of additional control sensors on the sides of the mouse that could be very useful for 3D and custom applications. A major market advantage is that the mouse in this configuration appears regular and therefore addresses concerns consumers might have in their mind at point of purchase about the usability of the mouse in the flat configuration, however, after purchase users may find they prefer either the flat or curved configurations equally. It is a key advantage in modern device user design to replicate form-factors that match users comfort zones and expectation as well as providing new features, such as mechanisms to make devices compact and portable.

In a further embodiment said docking cradle capable of being attached to the mouse and still storable within a card slot could be formed with an integral USB connector to enable the cradle to be plugged directly into a USB port to act as a traditional wireless receiver, or for USB recharging. Various hybrid embodiments are possible, either to provide wireless connectivity and recharge connection by means of the PCMCIA slot, or recharge via PCMCIA and wireless connectivity by means of USB, or for charge and connectivity via USB alone. Similarly for applications where wireless connectivity is embedded within the host computer device, said docking cradle could be implemented simply to aid storage in a PCMCIA slot or for recharge purposes. In further embodiments slot format may change, as is currently expected with the Card Express format which behaves in a similar way to existing PCMCLA/Card Bus ports but has a different connector and reduced dimension, however, a reduced docking cradle could be provided to be attached to the preferred mouse device to enable it to be partially stored within such a slot and similarly connected for recharge purposes. For host devices supporting new formats such as Card Express it is expected that there would be various wireless connectivity means such as Bluetooth and WiFi that reduce the need to embed dedicated wireless receiver circuitry in the docking cradle. In a preferred set of embodiments the overall mouse device would be implemented in a consistent and modular way suitable for attachment with a variety of docking cradles that would be selected by the end user depending on their host computer ports and needs.

A further embodiment could incorporate a surface touchscreen and flat flexible display 100 (as shown in FIG. 21A), such as an OLED (organic light emitting device), on the outer upper surface of the mouse device, that would receive wireless display data from the host computer. The advantage of this would be receive wireless display data from the host computer. The advantage of this would be to provide custom menu or selection information as well as to provide a navigation aid that would by way of example show applications in use on a desktop or a series of web-links or other navigation and control data, thus providing a rapid means of navigating directly to an application, web-site or domain, as well as feedback for user in navigating or controlling complex applications. Such an embodiment enables the mouse to provide advanced methods and systems of controlling applications and web navigation.

Further embodiments could be derived with more complex collapsing mechanisms to enable a larger three dimensional shaped mouse to be formed by using two overlapping upper and lower surfaces and sliding the base units apart to become longer and by utilizing the side-panels to pop up and support the overall profile. Similarly the overall device could be made expandable in width by using two overlapping upper surfaces that can slide over each other and by making the base expandable in width using a similar sliding mechanism. Furthermore, the overall mouse shell surface could be made more spherical by using a series of fold-up internal ribs, and making the upper surface more like a flexible skin, or forming it in several hinging sections to fold up and hinge to give a specific profile.

Similarly the docking cradle could incorporate or be replaced by an alternative interface connector, such as a USB or fire-wire connector.

Accordingly the overall flat and collapsible mouse device could become a highly portable, compact, easily storable, and versatile solution for mobile device interface needs.

BRIEF DESCRIPTION OF THE DRAWINGS

Embodiments of the present invention will now be described by way of example with reference to the accompanying drawings, in which:

FIG. 4 shows a similar three dimensional and exploded view of the mouse of FIG. 1 in a popped configuration;

FIG. 5A shows a plan and side views of the mouse device of FIG. 1 in the flat configuration and FIG. 5B in the popped configuration;

FIGS. 6A and 6B show cross-sections through the mouse device of FIG. 1 in the flat and popped configuration;

FIGS. 8 to 15 show a further preferred embodiment of the mouse device with buttons arranged over the sensor circuitry, with FIGS. 8 to 14 generally corresponding to equivalent views in FIGS. 1 to 7, and FIG. 15 showing a full exploded view;

FIG. 8A shows a three dimensional view of further preferred mouse device in the popped configuration having an ergonomic form, FIG. 8B shows the mouse device in the flat configuration and FIG. 8C shows the card-shaped docking tray;

FIG. 9A shows an example of how the overall mouse device of FIG. 8A may be stored in a docking tray in a card-shaped recess, such as a PCMCIA slot of a host device, FIG. 9B shows the mouse device removed leaving the docking tray connecting to the host device and FIG. 9C shows the mouse stored in a docking tray;

FIG. 10A shows a three dimensional and exploded view of the mouse of FIG. 8 in a flat configuration showing the components of the device. FIG. 10B shows a similar three dimensional and exploded view of the mouse of FIG. 8 in a popped configuration;

FIG. 11 shows a further three dimensional and exploded view of the mouse of FIG. 8 in a popped configuration showing the electronic components removed from the mouse;

FIGS. 12A and 12C show a plan and side cross-section views of the mouse device of FIG. 8 in the flat configuration for an implementation of the mouse with a preferred compact sensor and FIGS. 12B and 12D a similar side cross-section view of an implementation of the mouse with an alternative preferred optical sensor;

FIG. 15 shows a more detailed full explosion of the FIG. 10A view of the mouse components forming the mouse device of FIG. 8;

FIGS. 16 to 19 show further detail on preferred electronic component and optical sensor arrangements; FIG. 16 shows more detailed arrangement of the optical sensor assembly. FIG. 18 shows electronic circuit wiring schematics for example primary mouse device electronic control chips. FIG. 19 shows electronic circuit wiring schematics for example primary chips on a docking cradle acting as a wireless receiver;

FIGS. 20 to 23 show alternative embodiments of the docking cradle/connector used as a wireless receiver and recharge unit; FIG. 20A and FIG. 20B shows the docking cradle of FIG. 1C and FIG. 8C with a metal band between side-rails and protruding antenna. FIG. 20C shows a docking cradle with reduced side-rails and locking mechanism. FIG. 20D shows a mouse according to FIG. 1 or FIG. 8 with integral connector;

FIG. 21A,B,C shows a docking cradle with folding side-rails which also supports a sliding USB connector. FIG. 21D and FIG. 21E shows a docking cradle with folding side-rails and a removable USB connector linked by a flexible wire;

FIG. 24A shows a pop mechanism formed from a folding hinges forming a parallelogram. FIG. 24B showing a trapezium formed by sliding adjacent ends. FIG. 24C a triangular section formed by sliding alternative ends. FIG. 24D,E a wedge section formed by hinging at one end and showing hinged folding side sections.

DETAILED DESCRIPTION OF THE PREFERRED EMBODIMENTS

Figure 1:
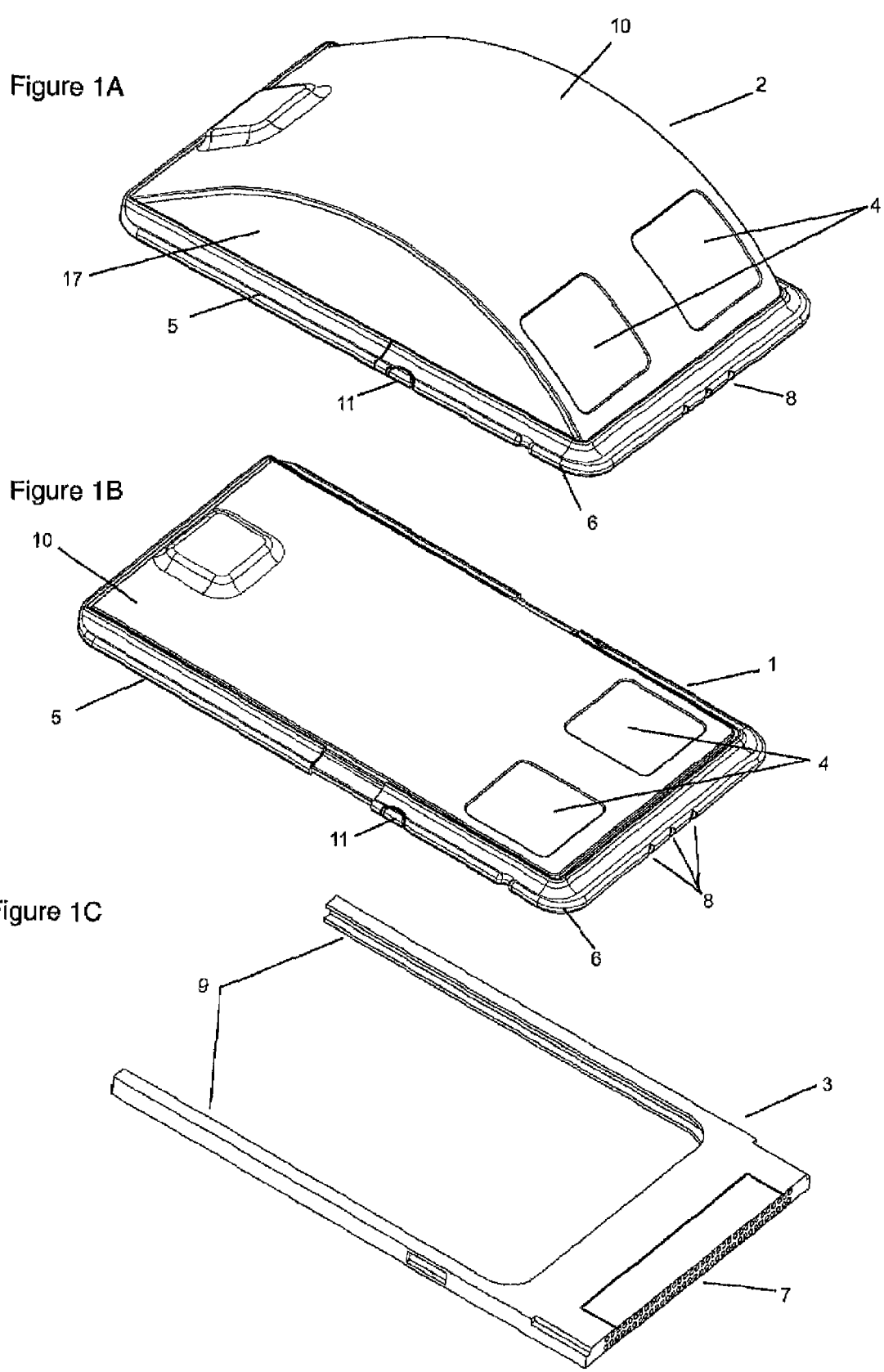
FIG. 1A shows a three dimensional view of the preferred mouse device in the popped configuration having an ergonomic form.
FIG. 1B shows the mouse device in the flat configuration and FIG. 1C shows the card-shaped docking tray.

FIG. 1A shows a 3-dimensional profile of a preferred mouse device in its popped configuration 2 having a curved ergonomic form and comprising an upper semi-flexible surface 10 supporting buttons 4 and being affixed at either end to a sliding base unit formed from one section 5 that slides into a second section 6 and is lockable by means of a release button 11, where said base supports hinging side-panels 17 that are shown perpendicular to the base unit enclosing the device and providing rigidity to the upper surface 10. Electrical connector nodes 8 are shown at the front of the base section 6 and suitable for connecting with the docking tray 3. FIG. 1B shows the overall mouse device in its flat 1 configuration where the upper surface 10 is parallel to the lower base units 5 and 6 which are shown at their extended position, with the mouse device being operable in both the flat 1 and popped 2 configurations. FIG. 1C shows an example docking tray 3 configured as a PCMCIA/Cardbus form to be storable within a card-shaped recess on a host device, and supports side-grooves 9 for encasing the mouse device 1 and connector pins 7 for connecting to a host device. Said docking tray 3 would preferably support wireless connectivity chips (such as Bluetooth) if not provided by the host device with the side-grooves 9 optionally supporting any required antenna.

Figure 2:
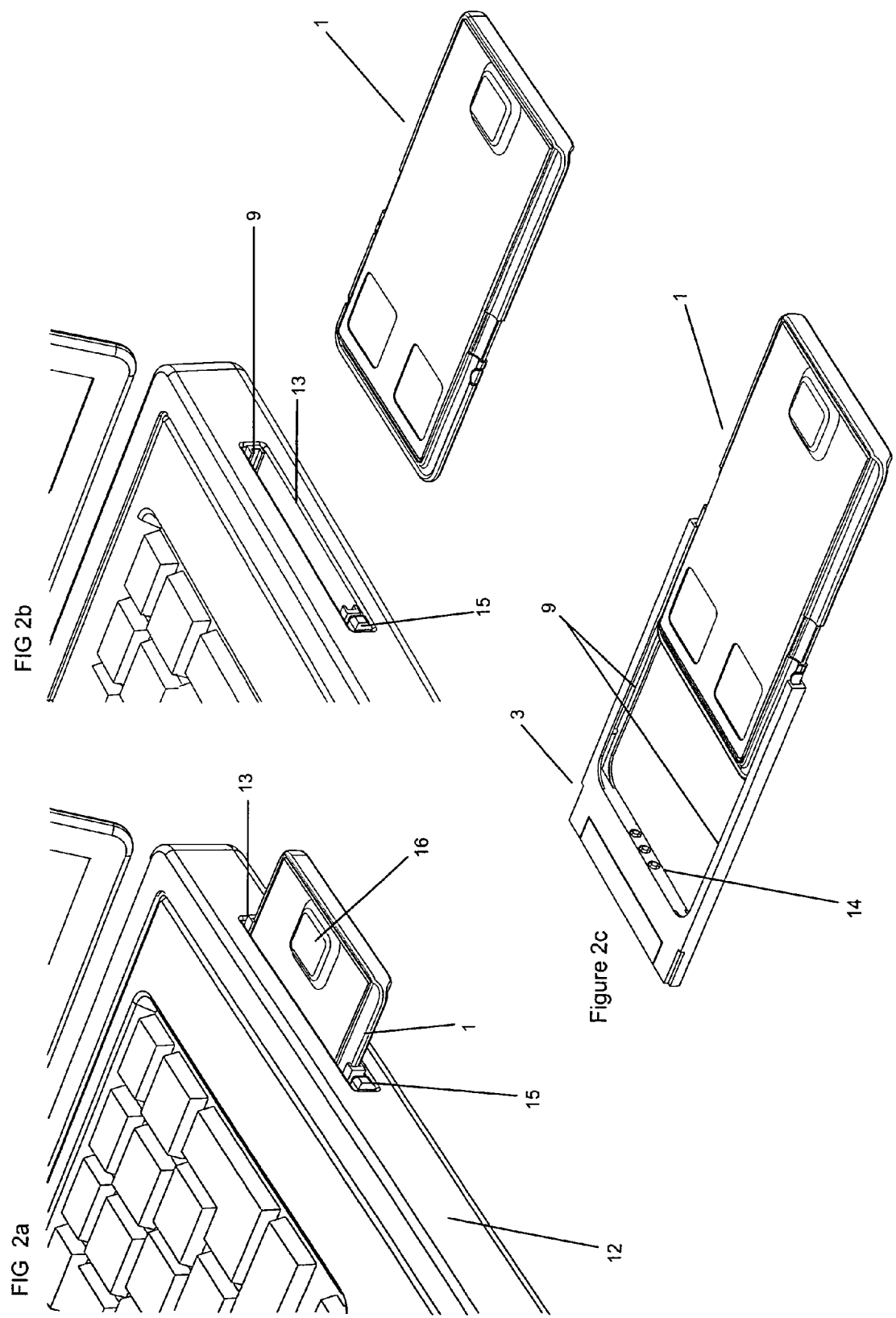
FIG. 2A shows an example of how the overall mouse device of FIG. 1 may be stored in a docking tray in a card-shaped recess, such as a PCMCIA slot of a host device.
FIG. 2B shows the mouse device removed leaving the docking tray connecting to the host device and FIG. 2C shows the docking tray on it's own supporting a partly removed mouse.

FIG. 2A shows an example of the overall mouse device 1 as it might appear when stored within its docking tray 3 within a card-recess 13 of a host device 12. Said host device generally supporting release prongs 15 that enable easy removal of the overall docking tray. Said overall mouse device 1 is shown slightly protruding from the card-recess 13 and can be slid from the docking tray 3 simply by pulling, said protruding section can optionally be thicker than the rest of the device and support larger chips, as is illustrated by the raised profile 16 on the upper surface 10, that can optionally be used as a suitable gripping point for pulling out the mouse device 1. FIG. 2B shows the mouse device removed and in use in a flat configuration and shows the docking tray 3 remaining in the card-recess 13 of the host device 12, to provide wireless connectivity between the mouse device and host-device through connector pins 7. FIG. 2C shows the docking tray 3 removed and more clearly illustrates how the mouse device 1 slides into the grooves 9 and how the electrical connectors 8 on the mouse device 1 connect with their respective connectors 14 on the docking tray 3. A sprung positioning pin could optionally be provided on the docking tray 9 and via a recess on the sides of the mouse device I base unit 6, to provide an audible click and positioning point to confirm the mouse device 1 is correctly stored. Similarly an LED indicator could be provided on the outer edge 6 of the mouse device 1, to indicate charging status or low power, and similar LEDs could be incorporated at the end of grooves 9 to indicate wireless connectivity or operable status.

Figure 3:
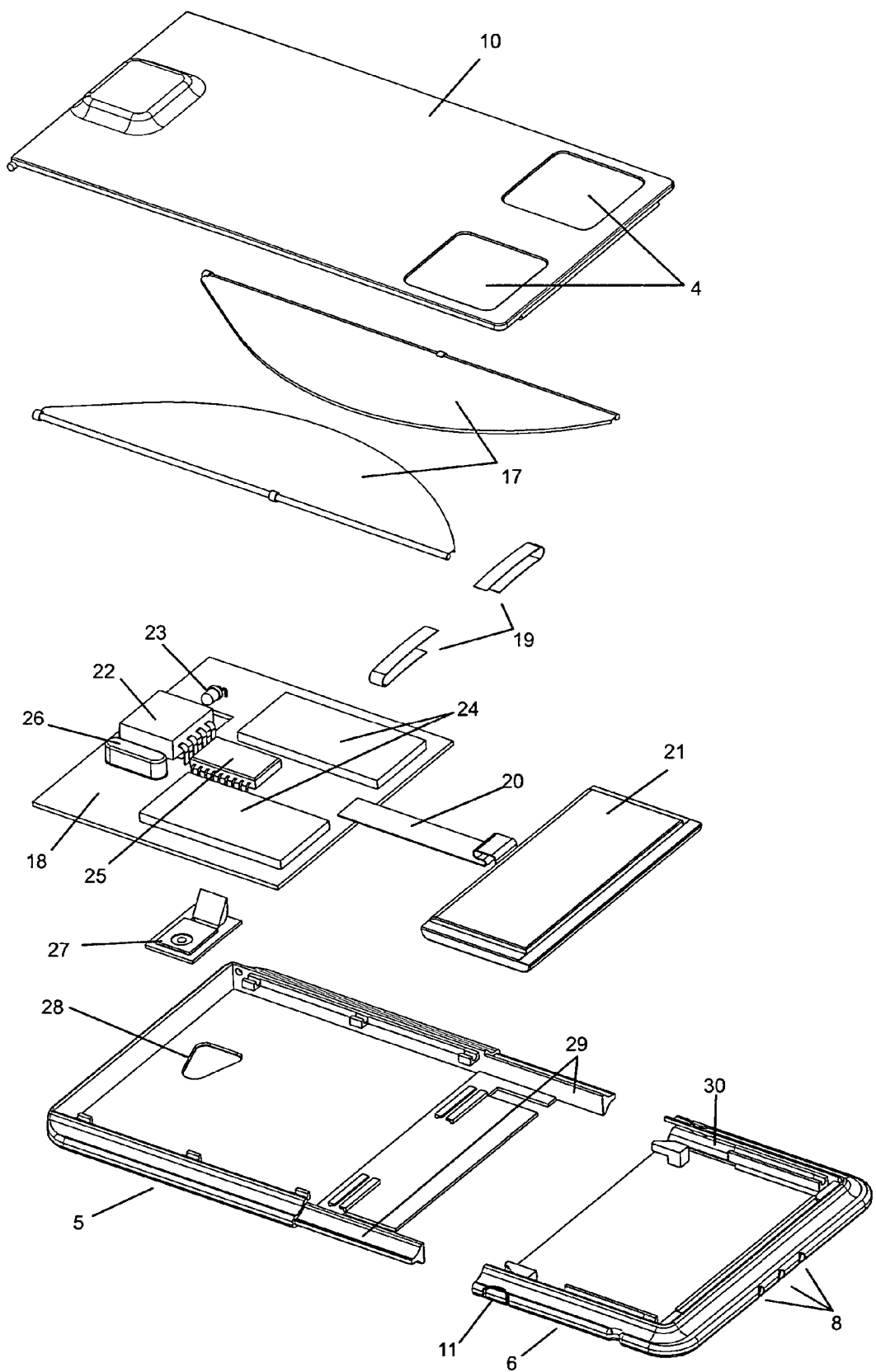
FIG. 3 shows a full three dimensional and exploded view of the mouse of FIG. 1 in a flat configuration showing the components of the device.

FIG. 3 shows a three dimensional exploded view of the overall mouse device 1 in a flat configuration where internal components have been positioned in a vertical displacement directly above the base unit 5, with the base unit 6 being shown horizontally separate for clarity. The upper surface 10 is seen to be comprised of a continuous semi-flexible material and supports buttons 4 that are touch-sensitive and formed from normal touchpad or capacitance sensing surfaces in the usual manner and would connect via flexible membrane via the underside of surface 10 to the circuit board. Side-panels 17 are shown as they would be stored in the flat configuration and are hinged at their sides 34. The sprung rib 19 is shown in its stored 'U' shaped position. The circuit board 18 supports a variety of standard components used to detect movement, and is shown by way of example to support a compact optical prism arrangement 17 that would reflect light from LED 23 through hole 28 in the base unit 5, in such a manner that the lens 17 would focus it forming an image on a photo-sensor array in chip 22 where small differences in sequential images of the pattern of reflected light would reflect movement, and reveal movement direction through the average directional shift in the reflected light pattern, or by the variety of other optical sensing means. Said circuit board 18 also supports wireless communication circuitry as illustrated by chip 25 and components 26. Similarly additional circuitry 24 could be used for control and data purposes, such as button and side-capacitance sensor control, or could optionally support thin-film gyroscopic Micromechanical systems (MEMS), that can detect movement due to small voltage or piezoelectric differences in very small flexible metal 'hairs' forming a direct part of a circuit which provides further methods of making the chip arrangement compact and low profile. A flexible wire 20 is shown connecting to a rechargeable battery unit 21 which would be stored on the different base section 6, and would flex as the base sections are pushed together. Similarly flexible connectors would be used between the circuit board 18 and the upper surface 10 for buttons 4, and side-panels 17 for capacitance sensing means. The lower image shows the base units 5 and 6 where the base unit 5 supports protruding shaped rails 29 that slide within recesses 30 on base unit 6 and a sprung locking button 11 that would be used to reversibly lock the base units together when the device is in the popped state. End shaping on the rails 29 or recesses 30, would be used to prevent the base units from being totally separated, in combination with a locking screw in the base units 5 and 6 to enable the device to be opened for maintenance, such as upgrading a battery or during assembly. The forward base unit 6 supports electrical connector recesses 8 that would receive protruding electrical connectors 14 on the docking tray 3.

FIG. 4 shows a three dimensional exploded view of the overall mouse device 2 in a popped configuration where internal components have been positioned in a vertical displacement directly above the base unit which is shown in the compressed position. The upper surface 10 is shown in an arch or curved form, due to compression, showing a raised profile 16 for enclosing any larger form chips, front touch buttons 4 next to a front edge shape that slides into a recess 36 on the base unit 6, and a back axis 42 for connecting to axis holes 36 on the base unit 5. Said upper surface 10 supports a slight edge shape, formed from a flexible material that serves to provide an outward end-stop to prevent the side-panel from hinging more than 90 degrees. The side-panel 17 is shown with a lower cylindrical axis edge 34 that slots into pivot grooves 40 in the base unit 5 and sliding grooves 33 on the front base unit 6, with shaped blocks 35 designed to fasten the side-panel to the base unit 5 and prevent it sliding, where the side-panel will slide with respect to the base unit 6 as the mouse device is collapsed between the flat and popped configurations. The side-panel 17 is also illustrated with a touch sensitive or capacitive sensing area 41 on the outer surface which could be used for additional sensor control such as 3D axis control on alternative sides of the mouse device 2.

FIG. 4B shows an enlargement view of the sprung rib and side-panel locking mechanism 19 which comprises a rigid rib 19 with sprung hinge at its centre, which is affixed within a groove 31 on the lower base unit 5 and captured within a sliding groove 32 on the side-panel and is biased to spring to a preferred seventy degree position, such that it will be partly stored under compression in a U shape when the overall device is flat, with the upper surface 10 stretched to be flat and compressing the side-panels into a flat position, but acts to push the side-panels up as the upper surface is curved upwards as the base units 5 and 6 are pushed together. Said rib 19 supports a wedge shaped protrusion 37 that abuts a similar inverse sprung wedge shape 38 on the base unit 6 during the last part of the compression, the effect being to force the sprung rib, now at a seventy degree V shape through the last few degrees to become vertical and perpendicular to the upper surface and base unit, as well as lock it in that position. Said wedge block 38 slides within a recess 39 within the joining section of the base unit 5 and would be slightly sprung and locked in place by a protrusion from the side locking buttons 11 such that the act of pushing the buttons, both unlocks the base units 5 and 6 and serves to unlock the wedge block which can spring back slightly freeing up the initial small degree inwards movement of the side-panels under the sprung rib that is needed to allow the upper surface and slide to begin. Similarly alternative side-panel fold up and locking means could be used such as linking the side-panels to folding hinges linked to the slide action of the base units.

FIG. 5A shows a cross-section through the mouse device in a flat configuration 1, and FIG. 5B the mouse device in a popped configuration 2 which shows more clearly the position and operation of the side-panel locking mechanism and rib 19, the mouse feet 44, and the inner profile of the circuit board 18 and chips 22, 23 and battery unit 21. Of note is the significant volume gained through the overall collapse mechanism, and the storage position of the flat mouse device 1 in the docking cradle 3 side groves 9.

FIG. 6A shows a plan and side views of the mouse device in the flat configuration 1 showing the overall card-shaped profile more clearly, and FIG. 6B which shows the mouse device in the popped 2 configuration where the curved or arched form of the surface 10 can be more clearly seen.

Figure 7A:
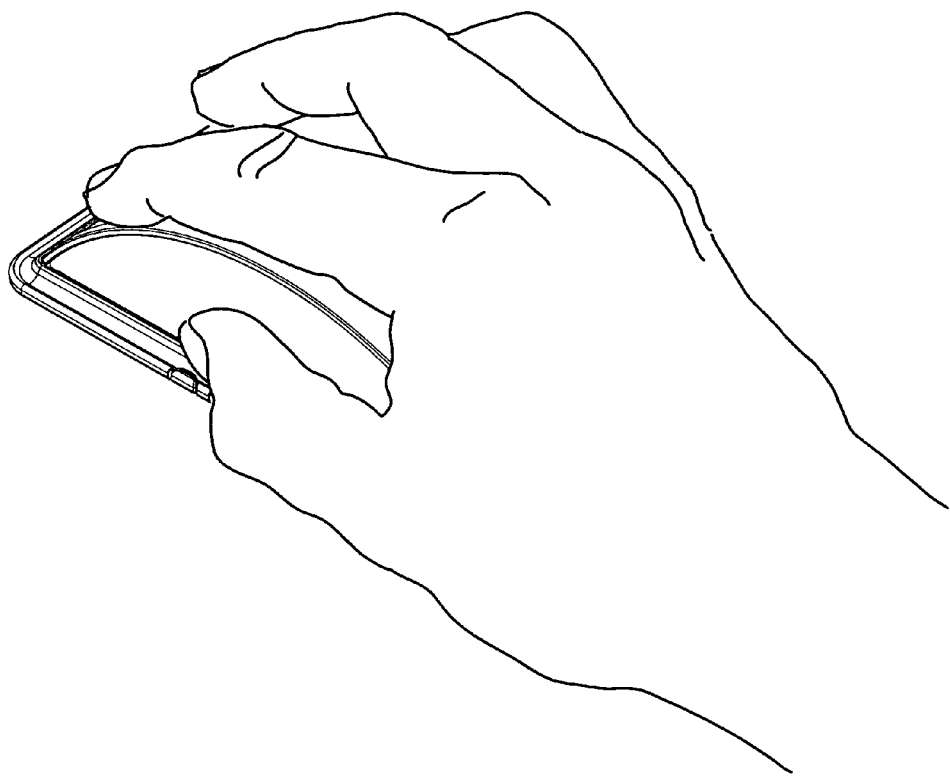
FIG. 7A shows the mouse being used in a popped ergonomic configuration.
Figure 7B:
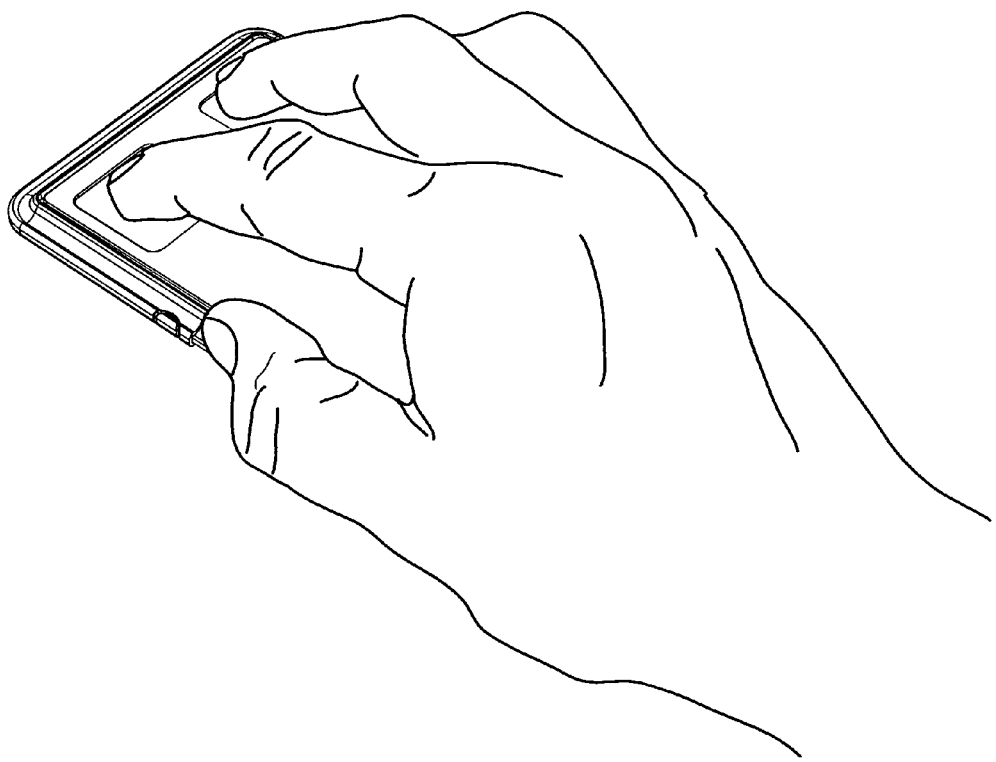
FIG. 7B shows an example of the mouse of FIG. 1 being used in a flat configuration.

FIG. 7A shows an example of how the mouse device is operable in a popped configuration 1, and used in a hand, and FIG. 7B shows how the mouse device is operable in the flat configuration.

FIGS. 8 to 15 show a further preferred embodiment of the mouse device with buttons that are shaped and positioned over the sensor circuitry, with FIG. 8 to 14 generally corresponding to equivalent views in FIG. 1 to 7, and FIG. 15 showing a full exploded view of internal components.

FIG. 8A shows a 3-dimensional profile of a preferred mouse device in its popped configuration 2 having a curved ergonomic form and comprising an upper surface 10 supporting buttons 4 and being affixed at either end to a sliding base unit formed from one section 5 that receives a second sliding front section 6 (see FIG. 11) and is lockable by means of a release button 11, where said base supports hinging side-panels 17 that are shown on a slight angle from perpendicular to the base unit enclosing the device and providing rigidity to the upper surface 10 which has slightly cambered side-edges. The upper surface 10 is relatively resiliently flexible it can expand and collapse between the popped and flat configurations. The buttons 4 have curved side shaping to improve ergonomics. Electrical connector nodes 8 are shown at the rear of the base section 5 and are suitable for connecting with the docking tray 3. FIG. 8B shows the overall mouse device in its flat configuration 1 where the upper surface 10 is parallel to the lower base units 5 and 6, which are in their extended position. The mouse device is operable in both the flat 1 and popped 2 configurations. FIG. 8C shows an example of a docking tray 3 configured as a PCMCIA/Cardbus form to be storable within a card-shaped recess on a host device. The docking tray 7 supports side-grooves 9 for encasing the mouse device 1 and connector socket 7 for connecting to a host device. The docking tray 3 preferably supports wireless connectivity chips (such as Bluetooth) if not provided by the host device, with the side-grooves 9 optionally supporting any required antenna.

FIG. 9A shows an example of how the overall mouse device of FIG. 8A may be stored in a docking tray in a card-shaped recess, such as a PCMCIA slot of a host device, and shows the buttons 4 and base optical section 6 protruding from the slot. Buttons 4 may be formed from touch-sensors, or be flexible and connect with a button sensor or switch mounted internally. The area between buttons 41 may support a touch-sensor suitable for measuring surface slide action. FIG. 9B shows the mouse device removed leaving the docking tray connecting to the host device and FIG. 9C shows the mouse stored in a docking tray.

FIG. 10A shows a 3-dimensional and exploded view of the mouse of FIG. 8 in a flat configuration showing the components of the device. FIG. 10B shows a similar 3-dimensional and exploded view of the mouse of FIG. 8 in a popped configuration. The button side shaping 4 may be formed as a separate piece made of a plastic, or support textured rubber-like material, and be affixed directly to the underside of the metal upper surface 10 and connect to button sensors 48 supported on a button chassis 66. The button chassis 66 also supports a touch sensor 41 and provides the means of connecting the upper surface 10 to the sliding front section 6. The sliding front section 6 forms an optical chassis supporting the sensor circuitry 22, antenna wiring, and front axles 67 for supporting the upper surface 10 via the button chassis 66. The sliding front section 6 is arranged to slide on rails 34 into the mounting chassis 70 (see FIG. 15) in the rear base section 5. The rails 34 also pass through holes in side supports 68 forming a hinge and holding them in position in the mounting chassis 70. The side supports 68 are affixed to side-panels 17 and connect to sprung struts 69 (equivalent to rigid ribs 19 in the first embodiment of the mouse), which act to spring and hinge the side-panels between the flat and popped configuration as the overall front chassis 6 is slid into rear section 5, as illustrated in FIG. 10B. FIG. 10B also shows in exploded form the rotated angle of the button chassis 66, buttons 4 and upper surface 10 in the popped configuration, and the angled position of the side panel 17. Side panel 17 is shown with a reduced arch on the front edge, with the gap being filled by the side shaping of the buttons 4.

Figure 11:
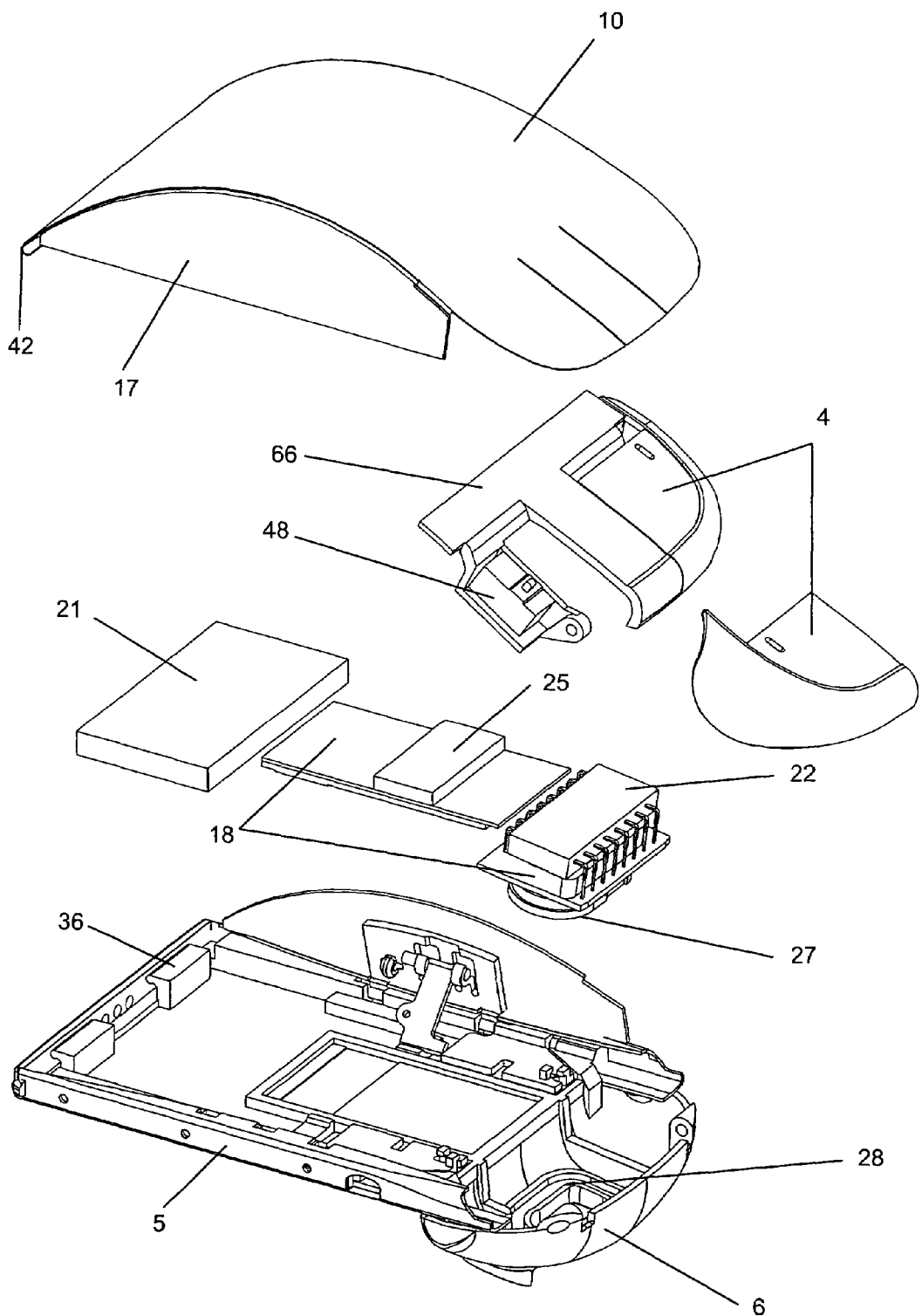

FIG. 11 shows a further enlarged 3-dimensional and exploded view of the mouse of FIG. 8 in a popped configuration. The internal electronic component layer 18 comprises a rechargeable battery 21; a main control circuitry board 18 supporting primary electronic chips such as a microcontroller and RF (radiofrequency) transmitter chip 25; and a front sensor circuit supporting an optical sensor 22 and antenna wiring or chip, a LED and optical lens, light-pipe 27 (see FIG. 16). The circuitry 18 and optical sensor are supported on the sliding optical front chassis 6 and are connected to the rechargeable battery 21 by means of a flexible connector 20 (see FIG. 17). Said rear chassis supports mouldings 36 for supporting a rear axle to connect with shaping 42 on the upper flexible surface 10. FIG. 11 more clearly shows the button chassis assembly, wherein button shaping 4, affixed to the underside of flexible metal surface 10 can pivot and compress a button sensor 48. Said pivot is formed by the natural flex of the metal surface 10 providing a small, mechanical, button-compression-action. Said button chassis is connected to the base front optical chassis 6 by means of axles 67, such that the button action behaves similarly when the overall mouse is in either the popped or flat configuration.

FIGS. 12A and 12C show a side and end cross-section view of the mouse device of FIG. 8 in the flat configuration with a preferred compact alternative sensor 49. FIGS. 12B and 12D show a similar side and end cross section view of an implementation of the mouse with an alternative preferred optical sensor 22 and lens 27. FIGS. 12A and 12C show the cross-section through the electronic circuitry and notably the external connectors 8, rechargeable battery profile 21, central mouse circuitry 18 supporting chip volume 25 arranged to fit a space envelope between side-supports 68 and side mountings 70. An example preferred compact sensor 49 illustrated in FIGS. 12A and 12C would integrate an optical chip 22, light source 23 and lens 27 and form a significantly smaller assembly that would enable the overall optical chassis 6 to have a reduced profile. FIGS. 12B and 12D also show an example touch-sensor 41 positioned to form a scroll surface between buttons 4, to act as a third button or scroll wheel useful for detecting slide action and providing additional control data to a nearby computer device. These Figures show the significant mechanical space constraints and clearly show the integrated nature of electronic component choices and the mechanical hinge and sliding mechanisms. With future availability of smaller sensors such as 41 more flexibility will be possible with slide/hinge mechanisms or to include additional electronic controls or a larger battery volume.

Figure 13A:
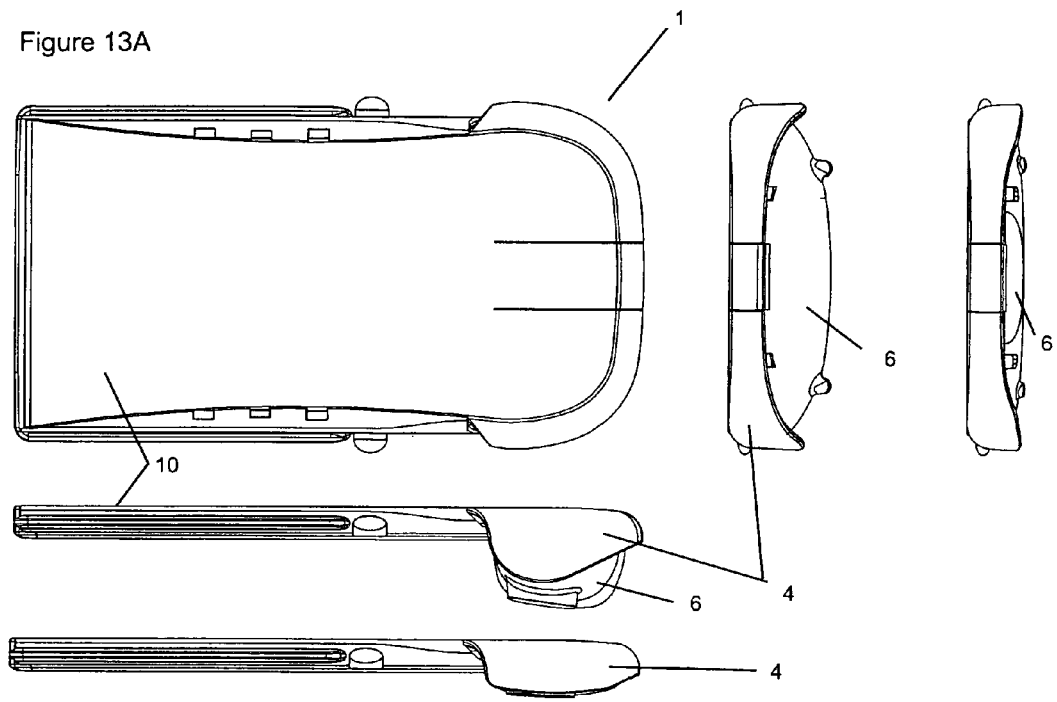
FIGS. 13A and 13B show cross-sections through the mouse device of FIG. 8 in the flat and popped configuration and also show a cross-section of a preferred embodiment with a more compact sensor chip.
Figure 13B:
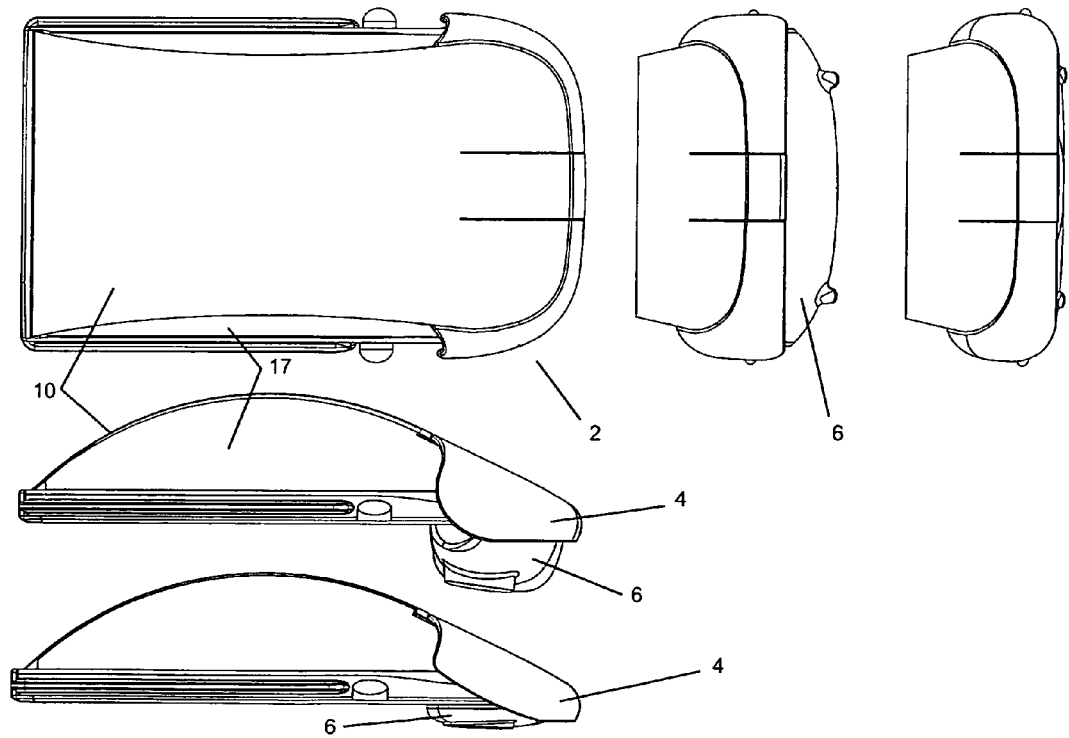

FIGS. 13A and 13B show cross-sections through the mouse device of FIG. 8 in the flat and popped configuration, and show an example of a reduced external and flatter profile formed by using more compact sensors as they become available. A benefit of the proposed sensor location in the preferred mouse embodiments in FIG. 1 (bulge 16) and FIG. 8 is that it is positioned to lie outside of the card-slot as illustrated in FIGS. 2A and 9A and can therefore have a larger volume than the rest of the mouse device.

Figure 14A:
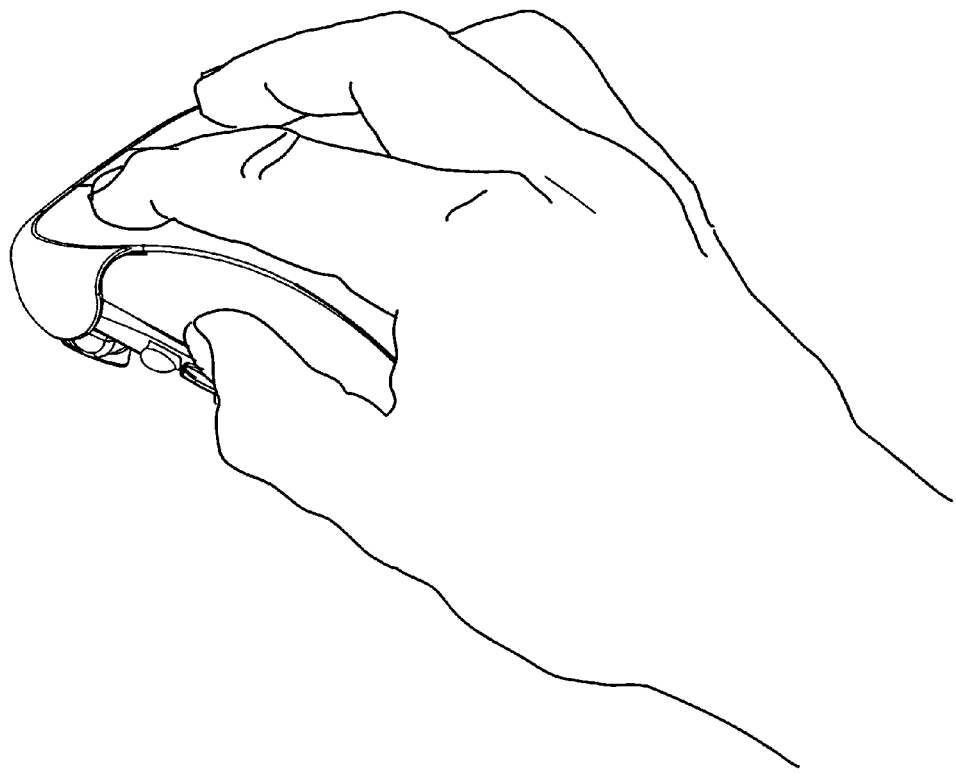
FIG. 14A shows an example of the mouse of FIG. 8 operable and being used in a popped ergonomic configuration.
Figure 14B:
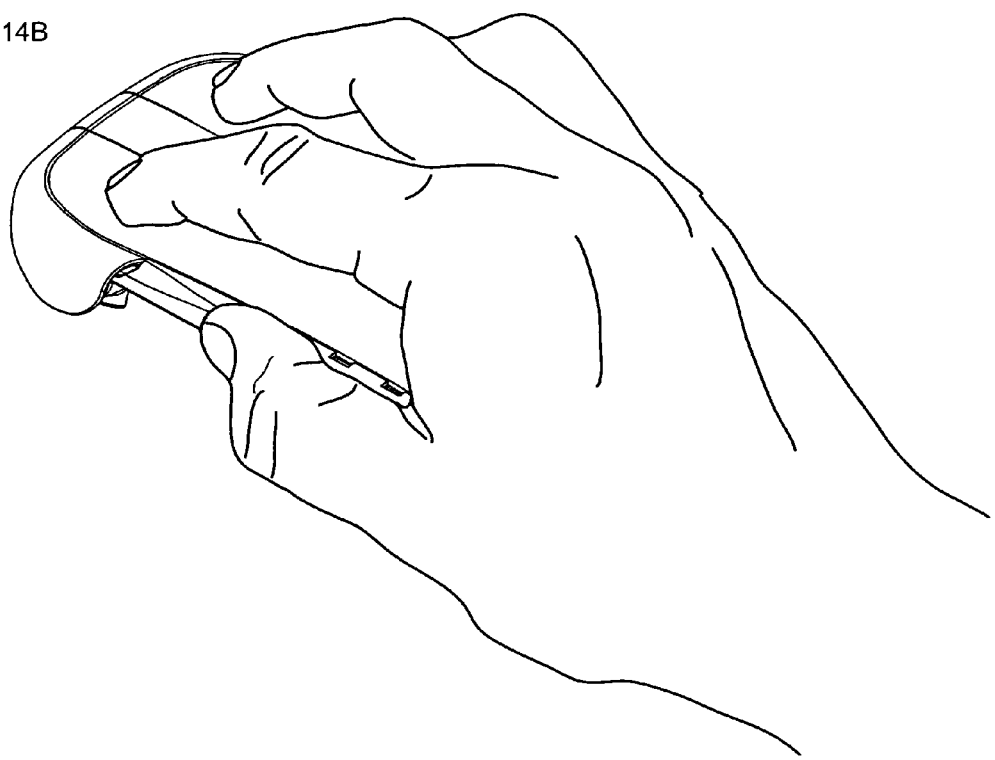
FIG. 14B shows the mouse operable and being used in a flat configuration.

FIG. 14A shows an example of the mouse of FIG. 8 operable and being used in a popped ergonomic configuration. FIG. 14B shows the mouse operable and being used in a flat configuration. Said buttons have the same mechanical or touch action in both the popped and flat configurations.

FIG. 15 shows a more detailed full explosion of a preferred mechanical implementation of components forming the mouse device of FIG. 8. Notably the front 6 and rear chassis 5 is formed from a sub-assembly of sub-components to enable easier manufacture. Similarly the strut and side-support mechanism and button assembly is broken down into components. The rear chassis 5 is preferably formed from a pressed metal plate and supports moulded side rails 30 shaped to match a recess on the docking cradle 3 sides 9 or shaped to directly fit a card-slot device. Said chassis 5 supports a hole to accommodate release buttons 11 that are shaped to spring and release against an appropriate profile on front sliding chassis 6. Pads 44 are affixed to the underside of chassis 5 and 6 to reduce the slide friction of the overall mouse device. An injection moulded mounting chassis 70 is shaped to be accommodated in the metal chassis 5 and supports grooves, recesses and mounting points for supporting sliding cylinder rails 34, release buttons 11, sprung side struts 69, side-supports 68, dog leg and coil springs 19, external connectors 8 and rear axle supports for the upper surface 10. The front optical chassis 6 supports holes to fix and fasten slide rails 34, and a recess to support the electronic circuitry board 18, optical circuitry 22 and lens 27, and front axle supports for front axles 67 that connect to the button chassis 66. Button chassis 66 supports button sensors 48 and is fastened to the underside of the flexible upper surface 10 that in turn supports button shapes 4. A modesty panel 71 would be attached to the underside of chassis 6 to enclose and correspond to the front recess on rear chassis 5, which would otherwise be exposed when the overall mouse device is in the extended and collapsed flat form.

FIGS. 16 to 19 show further detail on preferred electronic component and optical sensor arrangements.

FIG. 16 shows a reduced view of the mouse circuit board 18 shown in FIG. 3, comprising an optical chip 22, lens and light pipe 27 and LED 23 and rear chassis 5 with a recess. FIG. 16A shows an example of a small form-factor optical chip 22, with exploded view of lens 27 that supports a light pipe that passes through a slot in the circuit board 18 and receives light from LED 27 mounted onto the circuit board 18. FIG. 16B shows a similar view with a larger optical chip 22, where the LED 27 is mounted underneath the chip 22 and positioned on the circuit board 18 again to project light through a light-pipe 27 positioned in a slot underneath the chip. FIG. 16C provides a cross-section view through this arrangement showing the LED 23 and cross-section through the light-pipe and lens 27 which is mounted directly beneath the chip 22. The cross-section shows a preferred arrangement of optical sensor between button sensors in the front chassis 6. FIGS. 16D and 16E show further examples of light-pipe shapes, where the LED is similarly mounted adjacent to a more rhomboid light-pipe in FIG. 16E, or surface mounted through the circuit board in FIG. 16D and supported within a recess in the optical lens plastic into a reduced triangular light-pipe.

Figure 17A:
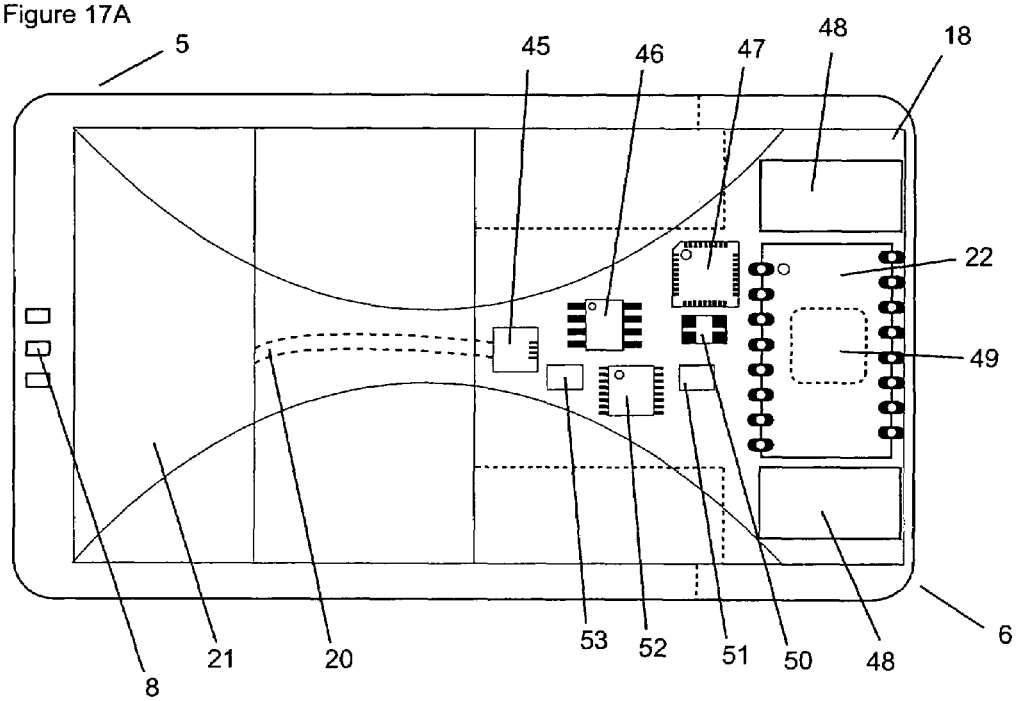
FIG. 17A shows a plan schematic view of the mouse device electronic components.
Figure 17B:
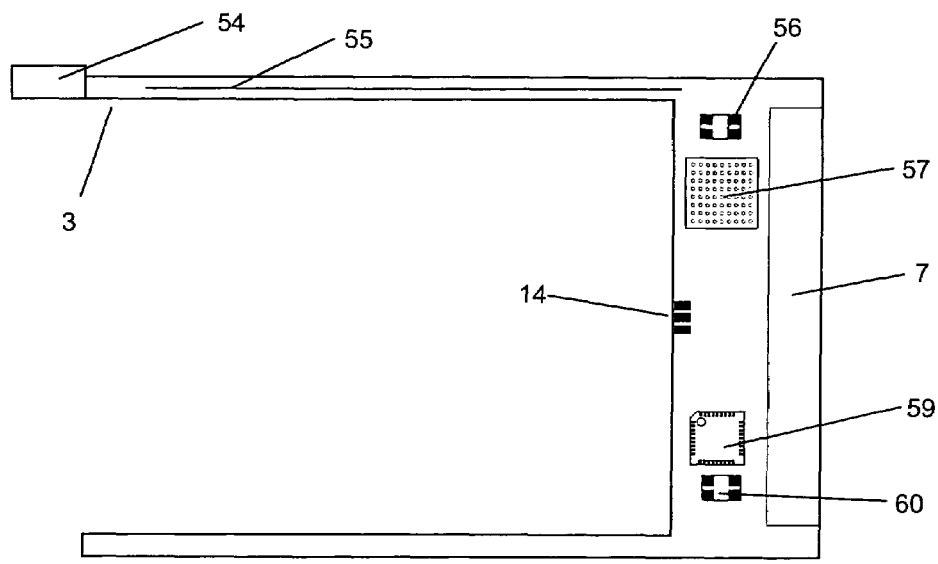
FIG. 17B shows a plan schematic view of components on a docking tray used as a wireless receiver and FIG. 17C a cross-section view.
Figure 17C:
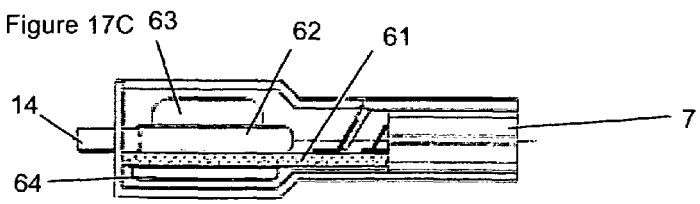

FIG. 17A shows a plan schematic view of the mouse circuit board 18 (FIG. 3) on front chassis 6, showing various mouse device electronic components connected via a surface mounted connector 45 to a flexible wire membrane 20 connected to a rechargeable battery 21 mounted on the rear section 5, which links to external connectors 8. Said electronic components comprise button sensors or switches 48 mounted adjacent to a sensor chip 22, which is preferably either an optical sensor 22 or reduced compact sensor 49, and supports primary mouse circuitry that includes control circuitry, wireless circuitry and power circuitry and is shown by way of example as a combined RF wireless transmitter and microcontroller 47, oscillator 50 for controlling the clock of a chip, recharge chip and circuitry 46 and voltage regulator 52, along with illustrative capacitors and resistor circuitry 51 and 53, with the larger format chips 47 and 50 being located in mouse volume 25. FIG. 17B shows a plan schematic view of the docking cradle 3 circuit board electronics, which may act in a preferred embodiment as the wireless receiver and recharge unit, and which by way of example is shown with a UART 57, oscillators 56, 60, combined RF receiver and microcontroller 59. Said UART provides an interface bus to the PC, and a serial port to the microcontroller, and may be a PCMCIA controller and serial port, or preferably act as a USB bridge enabling normal PC 'human interface' USB drivers to communicate directly with the device without the need for additional PCMCIA software driver installation. Said control circuitry also provides control of recharging by means of the electrical connections 14, which connect to connections 8 on the mouse device when the mouse is stored in the docking cradle. Said docking cradle 3 supports side rails 9 that embed a connection wire 55 linked to an antenna 54 mounted at the end of the rail, or where the wire 55 is itself configured to act as an antenna. Said antenna 54 may be formed either as a printed circuit antenna or as a solid-state ceramic antenna. FIG. 17C shows an example cross-section through the docking-cradle electronic circuitry with example upper mounted chips 62 and 63 corresponding as example to the UART chip 57 and oscillator 60, with lower mounted chip 64 corresponding to the combined microcontroller receiver chip 59, both connecting via the circuit board to PCMCIA connector 7 and to electrical connectors 14.

Figure 18:
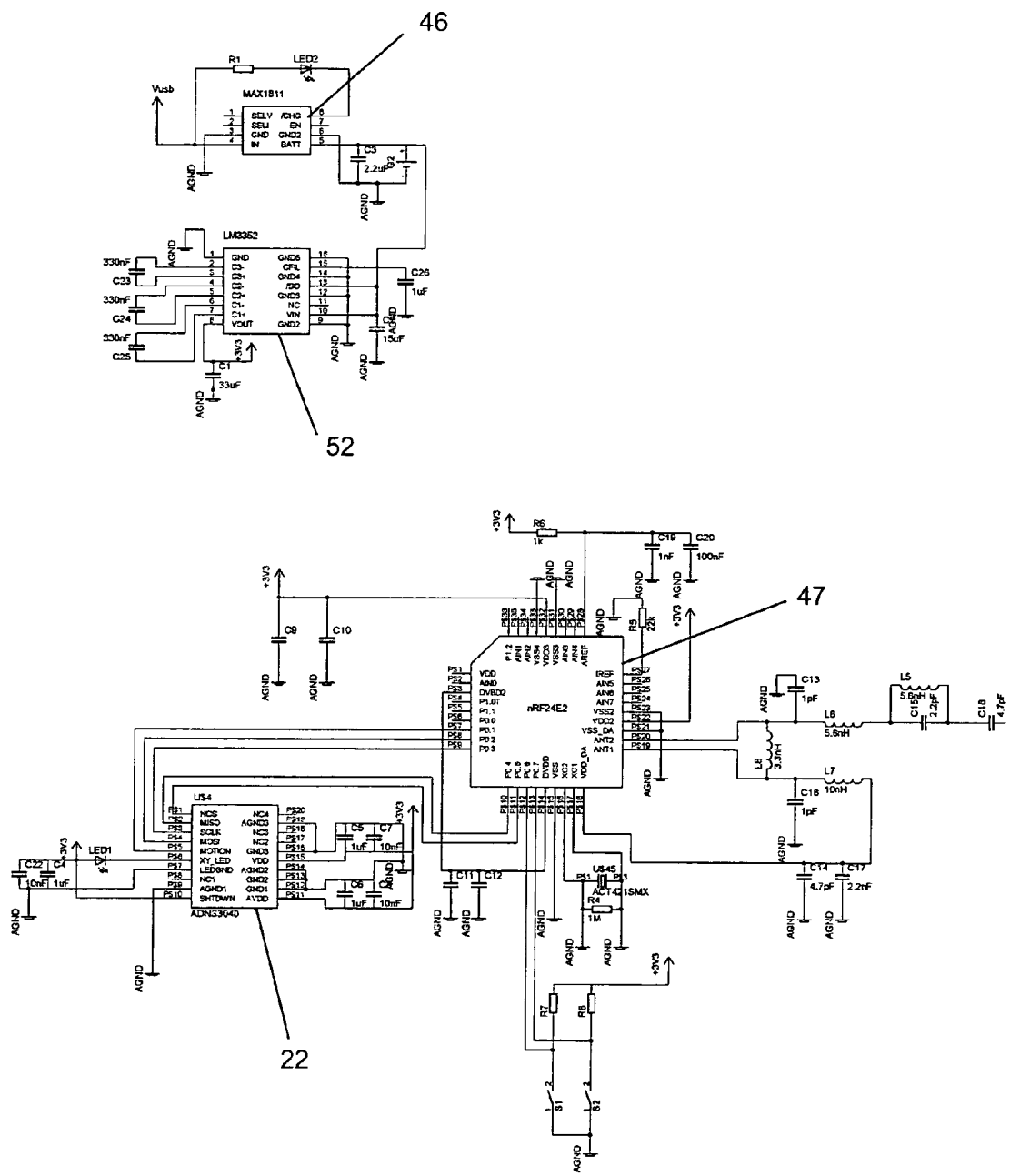

FIG. 18 shows an illustrative electronic circuit wiring schematic for an example implementation where the combined RF transmitter and microcontroller is a Nordic RF24E2 integrated chip, and the optical sensor is an Agilent 3040 series optical sensor with recharge chip MAX1811 and voltage regulator LM3352.

Figure 19:
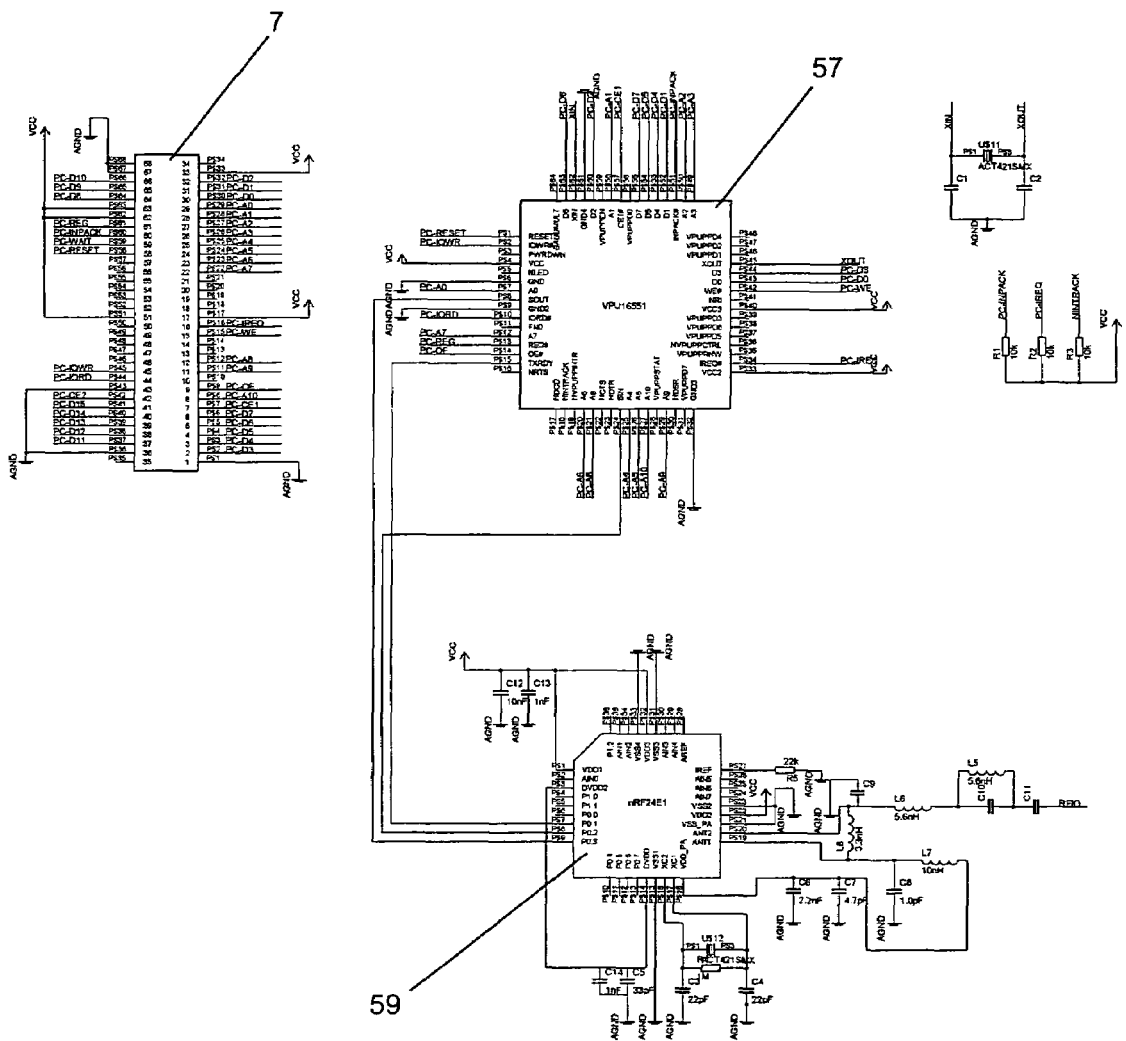

FIG. 19 shows illustrative electronic circuit wiring schematics for an example implementation where the docking cradle acts as a wireless receiver and recharge unit and by way of example uses a Nordic RF24E1 combined RF receiver and microcontroller and an Elan UART chip VPU16551 which connect to a PCMCIA connector 7. Said implementation could also be achieved with a simpler UART or USB bridge circuit. Certain computer devices support in-built wireless connectivity, such as Bluetooth which would remove the need for wireless receivers to be embedded within the docking cradle, as long as the mouse circuitry is versioned with an appropriate transmitter. Similarly said docking cradle could be implemented with normal USB wireless receiver circuitry that would need to be connected directly into an external USB socket to enable wireless communication with the mouse device. Such a docking cradle could also support recharging the mouse via USB when directly connected to the mouse.

A preferred purpose of the docking cradle 3 is to attach to the mouse in the collapsed flat configuration and enable storage when required of the mouse device in an appropriate card shaped recess of a computer device. Said attachment also allows the overall mouse device and docking cradle to be stored as one unit, say for example in a bag, making the overall device ultra-portable. A further preferred purpose of the docking cradle is to provide wireless connectivity to the card slot connector or alternatively a USB slot when there is no in-built connectivity in the computer device. A further preferred purpose is to provide connectivity and control means to enable recharging the mouse from the computer device by means of either the card slot or a USB connector. A common current card slot is the PCMCIA format, notably Type II, which is also known as CardBus. An emerging slot format is Card Express which has a modified smaller connector and shorter overall slot dimensions. FIGS. 20 to 23 show alternative preferred embodiments of the docking cradle 3 suitable for facilitating card slot or general storage, acting as a wireless receiver when required or providing recharge connectivity.

FIG. 20A and FIG. 20B show the docking cradle of FIG. 1C and FIG. 8C with a band 72 between side-rails and protruding antenna. Said band 72 prevents the mouse from being popped when stored in the cradle and provides additional strength to the docking cradle. Said docking cradle supports an antenna 54 affixed to the end of side rails 9. FIG. 20C shows a docking cradle with reduced side-rails 9 and sliding button 73 and locking mechanism 74 for fastening the cradle to the mouse device 1. FIG. 20D shows a further embodiment of a mouse according to FIG. 1 or FIG. 8 where the docking cradle is permanently attached to the mouse and thereby adds a connector 7 and appropriate side-rail shaping over mouse side rails 30 such that the overall integrated mouse and cradle device can directly be inserted into a card shaped recess.

FIG. 21 shows an example docking cradle 3 that supports an integral USB connector and can be attached to the mouse device enabling it to be stored in a card slot for recharging but is detachable from the mouse by means of release button 73 such that it can be used as an external USB wireless receiver. Such a configuration means that the wireless receiver behaves in the same way as typical USB 'dongle' receivers and can therefore use a similar electronic circuitry and software driver arrangement and frees up the card-slot for other devices. FIG. 21A shows a preferred embodiment of a wireless receiver USB docking cradle which, when attached via side rails 9 and locking clips 74 to the mouse, enables the overall device to be stored or recharged via the card slot. When said device is detached from the mouse 1 by means of release button 73, said reduced side-rails 9 can preferably fold flat about pivots 76 to create a reduced docking cradle form. Said button 73 also releases a sliding USB connector shown in FIGS. 21B and 21C, which is formed as a flat structure 77 supporting raised pins 78, which is capable of being connected into a normal USB slot. Said cradle device supports wireless receiver circuitry to act, when connected to a USB slot, as the receiver unit for the mouse.

FIG. 21D and FIG. 21E show a further embodiment of a USB dongle receiver where the USB connector 79 encasing raised USB prongs 78 and circuitry is removed from the cradle 3 and connected by means of a biased flexible wire 80, which has the benefit of easier positioning in USB slots that have more restricted access. Said detachable connector 79 could be optionally wedged at an angle within cradle groove 81 to temporary fasten the cradle 3 when the dongle receiver 79 is connected to a USB slot. The rails 9 may also support a cylinder protrusion 75 within side rails 9, which passes through a hole in the rear corners of chassis 5, serving to lock the mouse device 1 in the collapsed form by preventing the sliding rails 34 from compressing, such that the overall mouse cannot be popped when stored in the docking cradle.

Figure 22A:
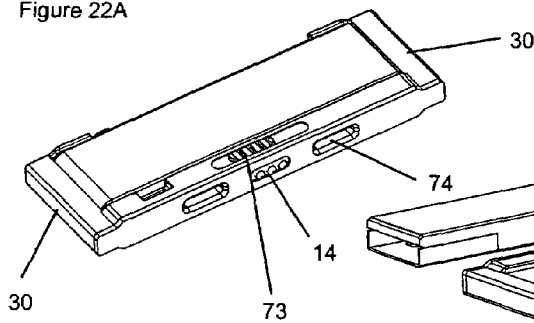
FIG. 22A,B shows a docking cradle with short side-rail shaping and supporting a removable USB connector.
Figure 22B:
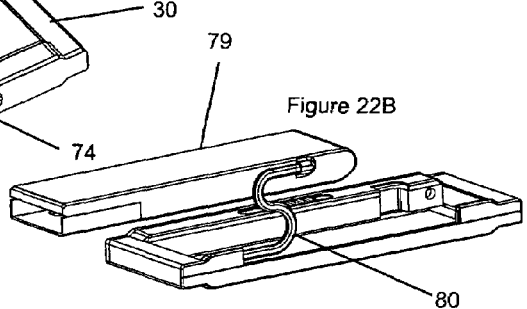
Figure 22C:
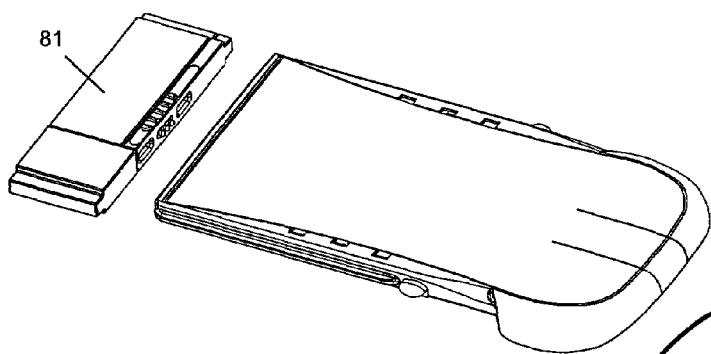
FIG. 22C,D,E,F,G shows a docking cradle with folding lid encasing a USB connector and recharge connector.
Figure 22D:
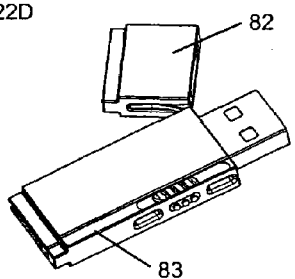
Figure 22E:
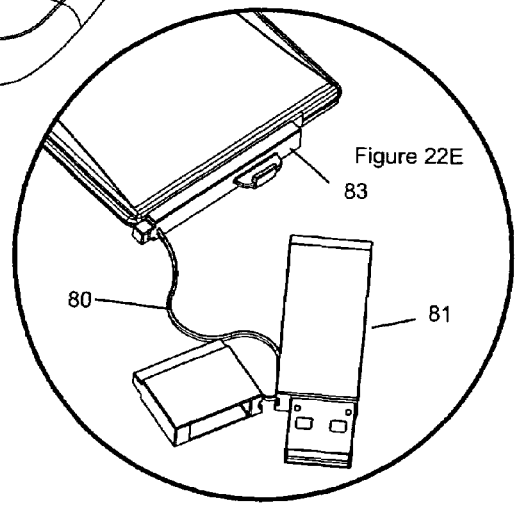
Figure 22F:
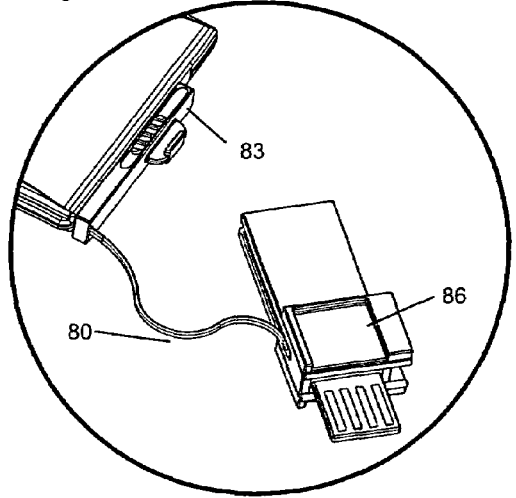
Figure 22G:
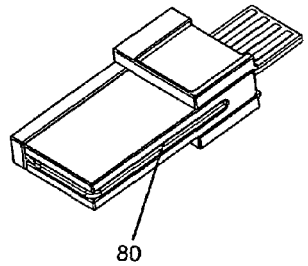

FIG. 22A and FIG. 22B show a further preferred USB docking cradle without extended side rails that additionally supports recharge circuitry, such that it can be used in isolation as a USB wireless receiver 79, or fastened to the mouse by means of locking clips 74 and electrical pins 14 for USB recharging via the flexible wire 80 and USB connector 79. Said cradle retains side shaping 30, so that the overall mouse when attached to the cradle can be stored inside a card-slot. Similarly FIG. 22C provides a further preferred embodiment of a USB docking cradle 81 which is shaped to be attached to a mouse device 1 and affixed by means of clips 74 such that the overall assembly can be stored in a card slot, but can be removed by means of release button 73 and folding back lid 82 to reveal a USB plug for connecting to a USB socket for connectivity or recharging as illustrated in FIG. 22D. Alternatively the cradle 81 can be slid off the mouse leaving recharge connector 83 attached to the mouse and connected to the USB socket by means of flexible wire 80 for recharging as illustrated in FIG. 22E. A further embodiment FIGS. 22F and 22G shows an alternative hinge mechanism of the lid 86 which folds in half backwards by 180 degrees.

Figure 23A:
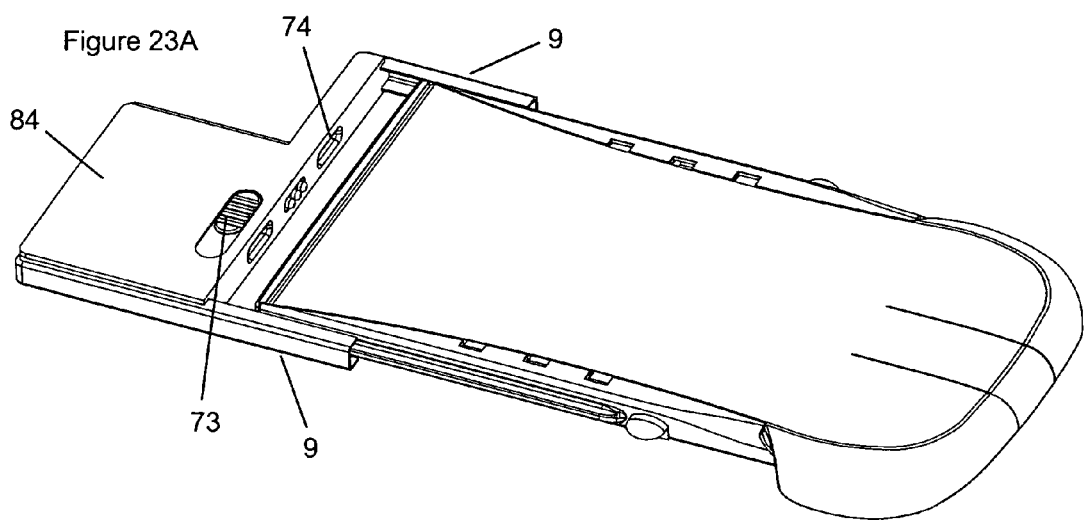
FIG. 23A shows an alternative embodiment of docking-cradle shaped for a Card Express slot, and supporting short side-rails FIG. 23B,C,D shows an embodiment of a folding connector integral to a mouse according to FIG. 1 or FIG. 8; and, FIG. 24 shows alternative embodiments of collapse mechanisms to reversibly expand between a flat and popped form.
Figure 23B:
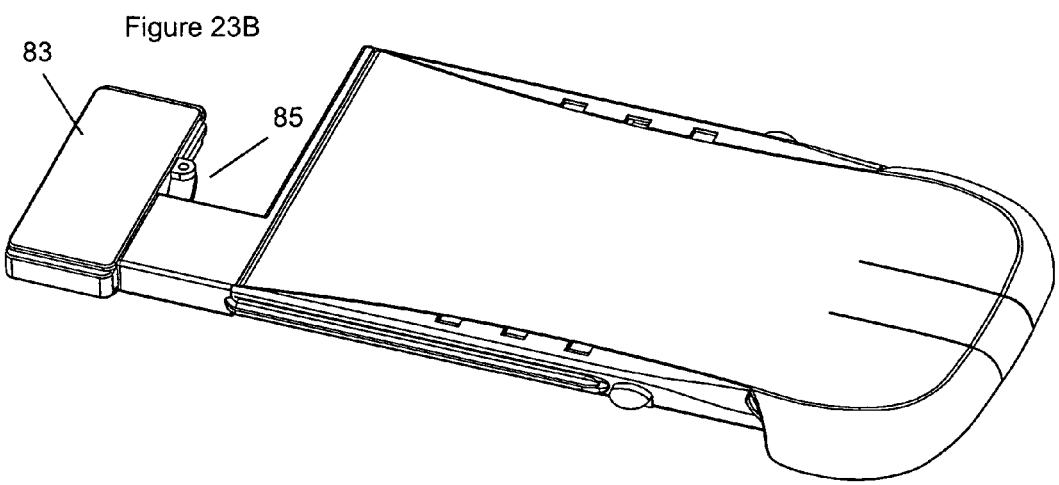
Figure 23C:
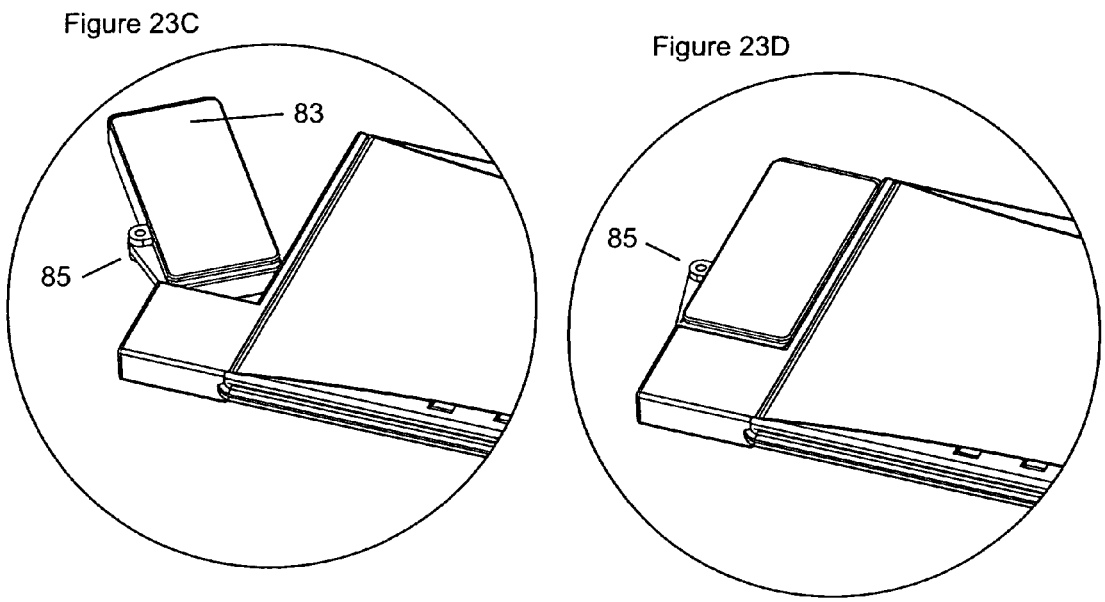
Figure 23D:
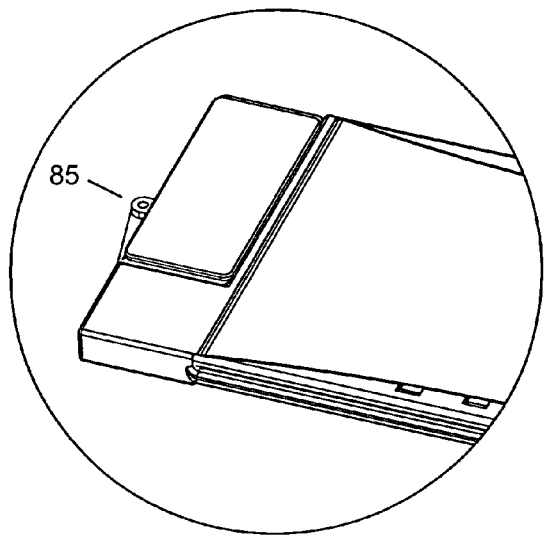

FIG. 23A shows an alternative embodiment of docking-cradle 3 shaped to be a Card Express docking cradle 84 which has a slot requiring a smaller connector 83 than the PCMCIA connector 7. Said cradle attaches to a mouse device 1 by means of clips 74 and side rails 9 and can be detached by means of release button 73. When attached the mouse can be recharged and partially stored in a Card Express slot. Computer devices incorporating Card Express are more modern and will generally support an integral connectivity means such as Bluetooth, such that this embodiment will generally not require an external wireless receiver. FIG. 23B provides a further embodiment where the Card Express connector is integral to the mouse device and is sprung about a pivot 85 to provide a deployed configuration forming the card express shape 84. FIG. 23C shows the connector 83 partially folded back and FIG. 23D shows the collapsed form where the connector 83 faces and locks inwards and has a more compact uniform shape where the mouse device can be used in both the flat or popped configurations.

FIG. 24 shows alternative embodiments of collapse mechanisms to reversibly expand between a flat and popped configuration. FIG. 24A shows a pop mechanism formed from folding hinges forming a parallelogram. FIG. 24B showing a trapezium formed by sliding adjacent ends. FIG. 24C shows a triangular section formed by sliding alternative ends. FIG. 24D/E shows a wedge section formed by hinging at one end and showing hinged folding side sections. FIG. 24D/E show an alternative approach for folding side-panels, which can fold flat by means of a central pivot line.

Although the invention is described and illustrated with reference to preferred embodiments of a flat and collapsible mouse device it is expressly understood that it is in no way limited to the disclosure of such preferred embodiments, but is capable of numerous modifications within the scope of the claims. By way of example the mouse device could be implemented with a more complex popped and extended configuration, supporting ribs and further ergonomic curvature within the mouse form, or could be extendable in width to form a much larger ergonomic form. Clearly the mouse could be implemented with a plurality of mouse technologies, from optical, to gyroscopic or via magnetic or capacitance sensing means. Similarly the mouse device could be formed in a larger planar structure suitable for storing on a surface of a portable device in a recess larger than a CardBus slot. Similarly the sliding mechanism could be applied to a generic mobile portable device to improve form factor and ergonomics in a deployed configuration.

The invention claimed is:

1. A mouse for controlling a cursor on a screen of a computing device, the mouse being reversibly expandable and collapsible between a flat generally planar configuration and a popped configuration, the mouse being operable in both configurations,
    wherein said mouse comprises a planar arrangement of a generally rigid base and a flexible upper surface affixed to a rotation axis at each end, and wherein said expansion from the flat to the popped configuration is achieved via a sliding motion that shortens and compresses the flexible upper surface to form a curved or arched profile due to the reduced chord length between opposing ends,
    wherein said mouse base supports rigid side-panels which are stored parallel to the base in the flat configuration and can hinge and reversibly lock at a generally upright position to the base and upper surface in order to provide support to the upper surface as the overall mouse is slid into the popped configuration,
    wherein the mouse is reversibly lockable in at least one of the flat configuration and the popped configuration.

2. A mouse according to claim 1, wherein said mouse base is formed from at least two interlocking units which have side rails and grooves in respective sides to enable a slide motion between at least two interlocking units, together with a lock operable to secure the mouse in a collapsed form until released by side buttons.

3. A mouse for controlling a cursor on a screen of a computing device, the mouse being reversibly expandable and collapsible between a flat generally planar configuration and a popped configuration, the mouse being operable in both configurations,
    wherein said device comprises a planar arrangement of a generally rigid base and a flexible upper surface affixed to a rotation axis at each end, and wherein said expansion from the flat to the popped configuration is achieved via a sliding motion that shortens and compresses the flexible upper surface to form a curved or arched profile due to the reduced chord length between opposing ends,
    wherein said mouse base supports rigid side-panels which are stored parallel to the base in the flat configuration and can hinge and reversibly lock at a generally upright position to the base and upper surface as the overall mouse is slid into the popped configuration, and
    wherein said side-panels are locked in their generally upright position by a sprung rib affixed to the base unit that is sprung biased to an intermediate angle between a zero degree position when the overall mouse is flat and an approximately ninety degree angle when the mouse is popped, and supports a protrusion arranged to mechanically slide over a similar protrusion on the sliding component of the base such that the act of completing the slide forces the sprung rib through the remaining angle and to reversibly lock in the approximately ninety degree position.

4. A mouse for controlling a cursor on a screen of a computing device, the mouse being reversibly expandable and collapsible between a flat generally planar configuration and a popped configuration, the mouse being operable in both configurations,
    wherein said device comprises a planar arrangement of a generally rigid base and a flexible upper surface affixed to a rotation axis at each end, and wherein said expansion from the flat to the popped configuration is achieved via a sliding motion that shortens and compresses the flexible upper surface to form a curved or arched profile due to the reduced chord length between opposing ends,
    wherein said mouse base supports rigid side-panels which are stored parallel to the base in the flat configuration and can hinge and reversibly lock at a generally upright position to the base and upper surface as the overall mouse is slid into the popped configuration, and
    wherein at least one of said side-panels is locked in its generally upright position by a sprung strut, one end of the strut being pivotably mounted to said side-panel and the strut being sprung relative to said side-panel such that the second end of the strut is urged against a surface of the mouse such that the side-panel is urged into its generally upright position when the mouse is expanded into the popped configuration.

5. A mouse according to claim 1, wherein said flexible upper surface forms a rigid surface both when flat and when in the popped configuration due to being stored under compression between opposing edges and being partly supported and locked by the rigid side-panels.

6. A mouse according to claim 1, wherein said side-panels support at least one button touch sensor or capacitance sensing layer for providing button touch selection and/or sliding touch selection data from a user.

7. A mouse according to claim 1, comprising a plurality of touch sensors for providing button touch response data or measuring surface slide action of a finger for providing co-ordinate and selection data.

8. A mouse according to claim 7, wherein the mouse has at least one button on said flexible upper surface for providing button touch selection data from a user and at least one capacitance sensing layer on said flexible upper surface for providing sliding touch selection data from a user suitable for operation mimicking a scroll wheel.

9. A mouse according to claim 1, comprising a sensing device for detecting lateral physical movement of the mouse and generating x-y position data suitable for controlling a cursor on a computing device.

10. A mouse according to claim 9, wherein said lateral movement sensing device comprises one of (i) an optical device, and (ii) a gyroscopic device comprising a piezoelectric vibrating element to detect motion or at least one micro electromechanical system formed as a thin-film structure.

11. A mouse according to claim 1, comprising control circuitry.

12. A mouse according to claim 1, comprising a wireless connectivity device constructed and arranged to transmit input data from the mouse for use in controlling a said cursor on a said computing device.

13. In combination a mouse according to claim 1 and a docking cradle for engagement with the mouse and of a shape suitable for being stored within a card-shape recess within a said computing device.

14. A combination according to claim 13, wherein said docking cradle is formed to be slidable into a card-shape recess of a said computing device that is a PCMCIA or CardExpress slot.

15. A combination according to claim 14, wherein said mouse has a rechargeable battery, said docking cradle is connectable to a said computing device by a standard interface so that said rechargeable battery is recharged when the docking cradle is slid into a said slot.

16. A combination according to claim 13, wherein said docking cradle has a USB connector for connecting to a said computing device and arranged and configured to allow at least one of (i) recharging a rechargeable battery of the mouse when the mouse is connected to the docking cradle, and (ii) wireless communication with the mouse when the mouse is not connected to the docking cradle.

17. A combination according to claim 13, wherein said mouse and said docking cradle are permanently attached to each other.

18. In combination, a mouse according to claim 1 and a USB connector that is connectable to the mouse and connectable to a said computing device and arranged and configured to allow at least one of (i) recharging a rechargeable battery of the mouse when the mouse is connected to the USB connector, and (ii) wireless communication with the mouse when the mouse is not connected to the USB connector.

19. A mouse according to claim 1, comprising an outer flexible surface, and a flexible touch panel display on the outer flexible surface to provide a navigation and control window by which a user can directly select from a custom menu or view navigation and context information to help control applications.

* * * * *